United States Patent  
Yuhara et al.

(10) Patent No.: US 7,475,169 B2  
(45) Date of Patent: Jan. 6, 2009

(54) STORAGE CONTROL SYSTEM AND METHOD FOR REDUCING INPUT/OUTPUT PROCESSING TIME INVOLVED IN ACCESSING AN EXTERNAL STORAGE SUBSYSTEM

(75) Inventors: Atsushi Yuhara, Yugawara (JP); Kazunobu Ohashi, Odawara (JP); Masao Nakano, Odawara (JP)

(73) Assignee: Hitachi, Ltd., Tokyo (JP)

( * ) Notice: Subject to any disclaimer, the term of this patent is extended or adjusted under 35 U.S.C. 154(b) by 249 days.

(21) Appl. No.: 11/362,085

(22) Filed: Feb. 27, 2006

(65) Prior Publication Data

US 2007/0168565 A1  Jul. 19, 2007

(30) Foreign Application Priority Data

Dec. 27, 2005  (JP) .............................. 2005-374652

(51) Int. Cl.  
*G06F 3/00*  (2006.01)

(52) U.S. Cl. ................ 710/38; 710/5; 710/15; 710/17; 710/18; 711/112; 711/154

(58) Field of Classification Search ................ 710/38, 710/5, 15, 17, 18, 1; 711/154, 170, 112, 711/113  
See application file for complete search history.

(56) References Cited

U.S. PATENT DOCUMENTS 6,842,793 B2 *  1/2005  Ohashi et al. .................. 710/5  
2004/0103261 A1  5/2004  Honda et al.  
2005/0210098 A1  9/2005  Nakamichi et al.

FOREIGN PATENT DOCUMENTS

JP  2003-205895  8/2004  
JP  2004-074749  9/2005

* cited by examiner

*Primary Examiner*—Hong Kim  
(74) *Attorney, Agent, or Firm*—Mattingly, Stanger, Malur & Brundidge, P.C.

(57)  ABSTRACT

There is a cache memory, which has a cache area allocated to each communication port of an external storage subsystem. When data conforming to an I/O command received from a host is in an external LDEV, and when there is no cache hit in this cache area, an I/O command is issued to this external storage subsystem, and then the result of I/O processing is sent to the host. A storage control system measures response time by issuing a dummy I/O command to each communication port. The larger cache capacity is allocated to a communication port with the larger measured value. As a result of this, there is an increased probability of a cache hit in a cache area corresponding to a communication port with a higher response time measured value.

20 Claims, 14 Drawing Sheets

FIG. 4A

EXTERNAL STORAGE TABLE 201

| | MEASUREMENT CLASSIFICATION | ALLOCATED UPPER LIMIT CAPACITY | VERIFICATION REQUIRED/NOT REQUIRED | ALARM NOTIFICATION THRESHOLD | I/O RESPONSE | I/O COUNT | RATIO OF CACHE CAPACITY |
|---|---|---|---|---|---|---|---|
| PORT A | <1> |  | <1> | <1> | <2> | <2> | <3> |
| PORT B | <1> | <1> | <1> | <1> | <2> | <2> | <3> |
| PORT C | <1> |  | <1> | <1> | <2> | <2> | <3> |

<1> MANAGER-INPUTTED SETTING
<2> AUTOMATICALLY SET BY INTERNAL PROCESSING
<3> CAN BE SET MANUALLY OR AUTOMATICALLY

FIG. 4B

FIRST EXTERNAL RESPONSE TIME TABLE 203

| NUMBER OF MEASUREMENTS | 1 | 2 | 3 | 4 | 5 | ......... | n | AVERAGE |
|---|---|---|---|---|---|---|---|---|
| MEASURED VALUE | 5 | 4 | 5 | 6 | 3 | ......... | 4 | 5.2 |

FIG. 4C

SECOND EXTERNAL RESPONSE TIME TABLE 205

| MEASURED VALUE RANGE | AT LEAST 0m, BUT LESS THAN 2m | AT LEAST 2m, BUT LESS THAN 4m | AT LEAST 4m, BUT LESS THAN 6m | AT LEAST 6m, BUT LESS THAN 8m | AT LEAST 8m | I/O COUNT (TOTAL) |
|---|---|---|---|---|---|---|
| NUMBER OF MEASUREMENTS | 1 | 2 | 8 | 1 | 0 | 12 |

FIG. 5A

INTERNAL STORAGE MAPPING TABLE 202

| WRITE INITIAL ADDRESS | DATA A | DATA B | DATA C | ...... |
|---|---|---|---|---|
| | AAAA | BBBB | CCCC | ...... |

FIG. 5B

CACHE MEMORY ALLOCATION TABLE 204

FEW ←----→ NUMEROUS

| STATISTIC OF MEASURED VALUES | CACHE CAPACITY RATIO |
|---|---|
| AT LEAST 0m, BUT LESS THAN 2m | 1 |
| AT LEAST 2m, BUT LESS THAN 4m | 2 |
| AT LEAST 4m, BUT LESS THAN 6m | 3 |
| AT LEAST 6m, BUT LESS THAN 8m | 4 |
| AT LEAST 8m | 5 |

STORAGE CONTROL SYSTEM AND METHOD FOR REDUCING INPUT/OUTPUT PROCESSING TIME INVOLVED IN ACCESSING AN EXTERNAL STORAGE SUBSYSTEM

CROSS-REFERENCE TO PRIOR APPLICATION

This application relates to and claims priority from Japanese Patent Application No. 2005-374652, filed on Dec. 27, 2005, the entire disclosure of which is incorporated herein by reference.

BACKGROUND OF THE INVENTION

1. Field of the Invention

The present invention relates to storage control technology, and more particularly to storage virtualization technology.

2. Description of the Related Art

A technology disclosed in the abstract of Japanese patent Application Laid-Open No. 2005-266933 and in the abstract of Japanese patent Application Laid-Open No. 2004-227558, for example, is known in this field.

All sorts of storage virtualization technologies are known. The storage virtualization referred to herein is technology, which provides storage resources belonging to a storage subsystem existing externally to a storage control system (hereinafter, external storage subsystem) as though they are the storage resources of the storage control system. When a virtual storage resource is specified as the access destination, the storage control system issues an I/O command (input/output command) for either reading or writing data to an external storage subsystem, which has the storage resource corresponding to this specified storage resource.

When data is written or read as a result of the storage control system issuing an I/O command to an external storage subsystem, the external accessing takes time. Thus, the length of time of the I/O processing specified by the storage control system (for example, the length of time for processing an I/O command received from a host of the storage control system) increases. It is desirable to reduce this length of time.

SUMMARY OF THE INVENTION

Therefore, an object of the present invention is to shorten the length of I/O processing time in a storage control system, which provides the storage resources of an external storage subsystem as though they are its own storage resources.

Other objects of the present invention should become clear from the following explanation.

A storage control system according to a first aspect of the present invention is the above-mentioned storage control system of a storage system comprising an external storage subsystem, which is a storage subsystem existing externally thereto, and the above-mentioned storage control system.

This storage control system can comprise one or more objects to which a plurality of external storage devices, being a plurality of storage devices provided in the above-mentioned external storage subsystem, is respectively mapped; a memory, which is a memory capable of storing data either written to an external storage device or read from an external storage device, and which has two or more memory areas respectively allocated to elements of two or more communication paths connecting the above-mentioned storage control system and the above-mentioned plurality of external storage devices; an I/O processor, which receives a first I/O command for a certain object of the above-mentioned one or more objects, and attempts either to acquire data in accordance with this first I/O command, or to secure a storage area for this data in the memory area corresponding to the element of the communication path to the external storage device mapped to the above-mentioned certain object, and if this attempt succeeds, sends the I/O result, which is the processing result of the above-mentioned first I/O command, to a transmission source of this first I/O command, and if the above-mentioned attempt fails, sends a second I/O command for carrying out access in accordance with the above-mentioned first I/O command to the external storage subsystem having the above-mentioned mapped external storage device, and thereafter, sends the result of the I/O processing to the above-mentioned transmission source; a monitor for monitoring the respective communication states of the above-mentioned two or more communication paths; and an allocating portion for allocating more memory area capacity to an element of a communication path with a poor communication state according to the result of monitoring.

Here, an object can be treated as a LUN to which an external storage device is directly mapped, or a LUN corresponding to a hereinbelow-described virtual device to which an external storage device is mapped, but it is not limited thereto, and a variety of storage resources can be employed.

An external storage device can be a physical storage device (for example, a hard disk or other such disk-type storage device), or it can be a logical storage device (for example, a logical device called a logical volume, logical device, or logical unit).

In a first mode, the above-mentioned storage control system can have one or more first communication ports capable of communicating with one or a plurality of external storage subsystems. The above-mentioned external storage subsystem can have one or more second communication ports capable of communicating with the above-mentioned storage control system. The above-mentioned communication path element can be treated as at least one of a first communication port, a second communication port, or an external storage device belonging to this communication path. One or a plurality of second communication ports can be connected to one first communication port, and a plurality of first communication ports can be connected to one second communication port.

In a second mode, the above-mentioned communication state can be treated as a statistic of either a measured value of a response time, or measured values of a plurality of response times of a second I/O command issued via a communication path.

In a third mode, the above-mentioned monitor can measure the response time of a certain communication path in the above-mentioned second mode by issuing a dummy second I/O command, which differs from the second I/O command for carrying out access in accordance with the above-mentioned first I/O command, to the above-mentioned certain communication path, and receiving the response of this dummy second I/O command.

In a fourth mode, the above-mentioned dummy second I/O command in the above-mentioned third mode can be treated as a dummy read command. The above-mentioned monitor can treat the access destination of the dummy read command issued each measurement as being different from the access destination of the previous measurement in the respective communication paths.

In a fifth mode, the above-mentioned dummy second command in the above-mentioned third mode can be treated as a dummy write command. The above-mentioned monitor can treat the access destination of the dummy write command issued each measurement as a prescribed storage area part of an external storage device in each communication path.

In a sixth mode, the above-mentioned monitor in the above-mentioned third mode can measure response time via a communication path to an external storage subsystem, which receives more read commands than write commands as second I/O commands from the above-mentioned storage control system, by issuing a dummy read command, and can measure response time via a communication path to an external storage subsystem, which receives more write commands than read commands as second I/O commands from the above-mentioned storage control system, by issuing a dummy write command.

In a seventh mode, the above-mentioned statistic in the above-mentioned second mode can be treated as an average value of the above-mentioned response time measured values of a plurality of measurements.

In an eighth mode, the above-mentioned statistic in the above-mentioned second mode can be treated as the range of response time measured values, of a plurality of ranges of response time measured values, in which the number of obtained response time measured values is the greatest.

In a ninth mode, when the above-mentioned monitor monitors the communication state of a certain communication path of a plurality of communication paths belonging to a certain group, it can treat another communication path of this plurality of communication paths as having the same communication state as the above-mentioned certain communication path without monitoring the communication state thereof.

In a tenth mode, the total capacity of a memory capable of being allocated to the elements of above-mentioned two or more communication paths is fixed, and the above-mentioned allocating portion determines the ratio of memory area capacity to be allocated to the elements of the above-mentioned respective communication paths based on the communication state of each communication path, and determines the memory area capacity to be allocated to the elements of the above-mentioned respective communication paths based on the ratio of memory capacity of the above-mentioned each communication path element, and the above-mentioned total memory capacity, and when there is a change in at least the memory area capacity of a certain communication path, the allocating portion can change the memory area capacity to be allocated to the certain communication path, and the memory area capacity to be allocated to another communication path.

In an eleventh mode, the above-mentioned first I/O command is a write command, and the above-mentioned storage control system can have an internal storage device, which is a different storage device than the above-mentioned memory, and data management information for managing the storage location of the data. If the above-mentioned I/O processor fails in the above-mentioned attempt upon receiving a write command, it can write data targeted by the above-mentioned write command to the above-mentioned internal storage device, and can register this data write destination in the above-mentioned data management information.

In a twelfth mode, the above-mentioned first I/O command in the above-mentioned eleventh mode is a read command. If the above-mentioned I/O processor fails in the above-mentioned attempt upon receiving a read command, it can determine whether or not the data targeted by the above-mentioned read command is stored in the above-mentioned internal storage device by referencing the above-mentioned data management information, and if it determines that this data is stored therein, can acquire this target data from the above-mentioned internal storage device, and if it determines that this data is not stored therein, can send a read command for reading out this target data to the above-mentioned external storage subsystem.

In a thirteenth mode, a storage control system can also comprise a verifying portion, which performs verification processing for a certain communication path if the monitored communication state is poor, and does not perform verification processing if the above-mentioned communication state is not poor. The above-mentioned verification process can be treated as a process in which data written to the above-mentioned external storage device in accordance with a write command to this external storage device is read, the read data is compared against the data targeted by this write command, and a determination is made as to whether or not these data coincide.

In a fourteenth mode, two or more external storage subsystems are communicatively connected to the above-mentioned storage control system, and the above-mentioned storage control system can also comprise a data controller for carrying out data copying or migration between a certain external storage subsystem and another external storage subsystem when a monitored communication state meets a prescribed condition.

In a fifteenth mode, the above-mentioned storage control system can be communicatively connected to a host that issues a first I/O command to said storage control system, and can have an internal storage device, which is a different storage device than the above-mentioned memory. The above-mentioned I/O processor can have a first host interface portion, which is connected to the above-mentioned host, and a second host interface portion, which is communicatively connected to the above-mentioned external storage subsystem. The above-mentioned first host interface portion requests that the above-mentioned second host interface portion access an external storage device, which is mapped to the above-mentioned certain object, and, in accordance with this request, the above-mentioned second host interface portion can issue the above-mentioned second I/O command to an external storage subsystem connected to itself.

A storage control system according to a second aspect of the present invention is the above-mentioned storage control system of a storage system comprising an external storage subsystem, which is a storage subsystem existing externally of the storage control system, the above-mentioned storage control system, and a host of the above-mentioned storage control system. The above-mentioned external storage subsystem has one or more first communication ports capable of communicating with the above-mentioned storage control system, and a plurality of external storage device, which is a plurality of storage devices. The above-mentioned host is constituted so as to issue a first I/O command to the above-mentioned storage control system for either reading data or writing data.

In this case, the above-mentioned storage control system comprises a second communication port capable of communicating with the above-mentioned host; one or more third communication ports capable of communicating with one or a plurality of external storage subsystems; one or more objects respectively mapped to the above-mentioned plurality of external storage devices;

a memory, which is a memory capable of storing data either written to an external storage device or read from an external storage device, and which has two or more memory areas respectively allocated to elements of two or more communication paths connecting the above-mentioned storage control system and the above-mentioned plurality of external storage devices; an I/O processor, which receives a first I/O command for a certain object of the above-mentioned one or more objects, and attempts either to acquire data in accordance with this first I/O command, or to secure a storage area for this data in the memory area corresponding to the communication path element to the external storage device mapped to the above-mentioned certain object, and if this attempt succeeds, sends the I/O result, which is the processing result of the above-mentioned first I/O command, to a transmission source of this first I/O command, and if the above-mentioned attempt fails, sends a second I/O command for carrying out access in accordance with the above-mentioned first I/O command to the external storage subsystem having the above-mentioned mapped external storage device, and thereafter, sends the result of the I/O processing to the above-mentioned transmission source; a monitor for monitoring the respective communication states of the above-mentioned two or more communication paths; and an allocating portion for allocating more memory area capacity to a communication path element with a poor communication state according to the result of monitoring. The above-mentioned communication path element is at least one of a first communication port, a third communication port, or an external storage device, which belongs to the communication path. The above-mentioned communication state is a statistic of a plurality of measured values of response times of a second I/O command issued via a communication path.

The above-mentioned monitor can measure the response time of the above-mentioned certain communication path by issuing to the certain communication path a dummy second I/O command, which differs from the second I/O command for carrying out access in accordance with the above-mentioned first I/O command, and receiving the response of this dummy second I/O command. The above-mentioned statistic is either an average value of the above-mentioned plurality of response time measured values, or a range of response time measured values, of a plurality of response time measured value ranges, in which the number of obtained response time measured values is the greatest. The total memory capacity capable of being allocated to the elements of above-mentioned two or more communication paths is fixed. The above-mentioned allocating portion allocates a high ratio of memory area capacity to an element for which the statistic of the communication path is greater than a prescribed value, allocates a low ratio of memory area capacity to an element for which the above-mentioned statistic is less than a prescribed value, and determines the memory area capacity to be allocated to the elements of the above-mentioned respective communication paths based on the ratio of memory capacity of the elements of the above-mentioned respective communication paths and the above-mentioned total memory capacity.

The respective portions described hereinabove can be called the respective means. Each portion or means can be realized by hardware (for example, a circuit), a computer program, or a combination of these (for example, one or a plurality of CPUs for reading and executing a computer program). Each computer program can be read in from a storage resource (for example, a memory) comprising a computer machine. This computer program can also be installed in this storage resource via a CD-ROM, DVD (Digital Versatile Disk), or other such recording medium, or it can be downloaded via the Internet, a LAN, or some other such communication network.

BRIEF DESCRIPTION OF THE DRAWINGS

FIG. 4A shows an example of the constitution of an external storage table;

FIG. 4B shows an example of the constitution of a first external response time table;

FIG. 4C shows an example of the constitution of a second external response time table;

FIG. 5A shows an example of the constitution of an internal storage mapping table;

FIG. 5B shows an example of the constitution of a cache memory allocation table;

DESCRIPTION OF THE PREFERRED EMBODIMENT

A first embodiment of the present invention will be explained hereinbelow by referring to the figures.

Figure 1:
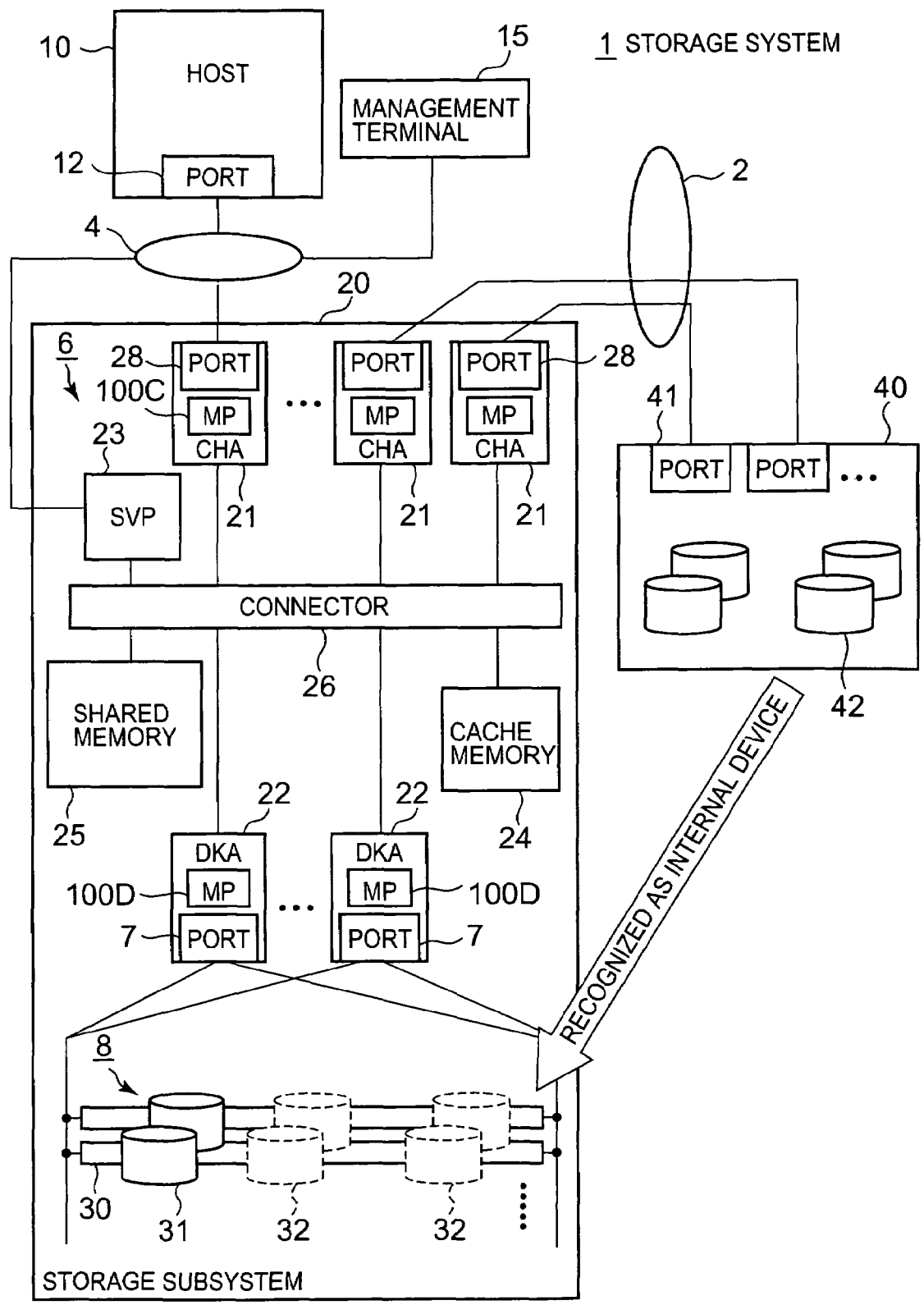
FIG. 1 is a block diagram showing a storage system related to a first embodiment of the present invention.

FIG. 1 is a block diagram showing a storage system related to a first embodiment of the present invention.

For example, a host, management terminal 15, and storage subsystem 20 are connected to a first communication network 4. Further, the storage subsystem 20 and a separate storage subsystem, which exists externally of the storage subsystem 20 (hereinafter, external storage subsystem) 40, are connected to a second communication network 2. The communication network can be divided into a first network and a second network as described hereinabove, or there can be a single communication network. A variety of communication networks can be utilized, such as, for example, a LAN (Local Area Network), SAN (Storage Area Network), and dedicated lines. The external storage subsystem 40 can be one unit, or a plurality of units. The attributes of the external storage subsystem 40 (for example, model, vendor, version, and so forth) can be the same as or different from the attributes of the storage subsystem 20.

The host 10, for example, is a computer system comprising a CPU (Central Processing Unit), memory, and other such information processing resources, and, for example, is constituted as a personal computer, workstation, mainframe, or the like. The host 10 is provided with a communication port (for example, the port provided in a LAN card or host adapter) 12 is provided for accessing the storage subsystem 20 via the first communication network 4. The host 10 can issue an I/O (input/output) command via the communication port 12 for requesting a data read or data write.

The storage subsystem 20 can provide a host data storage resource (a resource (for example, a logical storage device) for storing data to be read and written to the host 10) having an external storage subsystem 40 to the host 10 as its own host data storage resource. The storage subsystem 20 can be treated as a disk array system comprising a disk-type storage device 30, but it does not have to have a disk-type storage device 30; this disk array system can be a switching device constituting a communication network (for example, a high-functionality, intelligent fibre-channel switch).

Since the storage subsystem 20 and external storage subsystem 40 can employ the same constitution, a typical example of the constitution of the storage subsystem 20 will be explained below. The storage subsystem 20 can be broadly divided into the controller part 6 and the storage device part 8.

The storage device part 8 comprises a plurality of disk-type storage devices 30. Two or more disk-type storage devices of the plurality of disk-type storage devices 30 are constituted as a RAID group (also called a parity group or array group), and one or a plurality of logical storage devices (hereinafter LDEV) 31 is provided based on the physical storage resources of this RAID group. Similarly, one or a plurality of LDEV 42 is also provided in the external storage subsystem 40. Hereinbelow, an LDEV 31 allocated to a physical storage resource inside the storage subsystem 20 will be called an "internal LDEV 31", and an LDEV 42 allocated to a physical storage resource of the external storage subsystem 40 will be called an "external LDEV 42".

The LDEV 32 indicated by the dotted lines inside the storage device part 8 show a state, wherein the external LDEV 42 of the external storage subsystem 40 have been incorporated into the storage subsystem 20 side. In other words, in this embodiment, a LDEV 42 exists externally as seen from the storage subsystem 20, and an external LDEV 42 storage resource can be provided to the host 10 as an internal LDEV 32 of the storage subsystem 20.

The controller part 6, for example, comprises a plurality of channel adapters (CHA) 21, a plurality of disk adapters (DKA) 22, a service processor (SVP) 23, a cache memory 24, a shared memory 25, and a connector 26. At least one of either the cache memory 24 or the shared memory 25 can comprise a plurality of memories.

Each CHA 21 can be treated as a circuit board comprising one or a plurality of communication ports 28, one or a plurality of microprocessors (hereinafter, MP) 100C, and a memory not shown in the figure. The storage subsystem 20 has a CHA 21, which communicates with the host 10 via a first communication network 4, and a CHA 21, which communicates with the external storage subsystem 40 via a second communication network 2.

A DKA 22 transfers data between disk-type storage devices 30. The DKA 22 can be treated as a circuit board comprising one or a plurality of communication ports 7, one or a plurality of MP 100D, and a memory not shown in the figure. When data is inputted and outputted between internal LDEV 31 via a communication port 7, the DKA 22 can change a logical address to a physical address.

The SVP 23, for example, can be a device (for example, a personal computer) comprising an input/output console and a control console, or it can be a control console (for example, what is called a mother board) connected to an input/output console (for example, a management terminal 15).

The cache memory 24 is for temporarily storing data received from the host 10 and data read from an internal LDEV 31. Control information is stored in the shared memory 25. A work area capable of storing messages exchanged between MPs, and an area for storing control information for controlling the storage subsystem 20 can also be provided in shared memory 25.

The connector 26 interconnects the CHA 21, DKA 22, cache memory 24, and shared memory 25. The connector 26, for example, can be constituted as a highspeed bus, such as an ultra-highspeed crossbar switch or the like, which carries out data transmission via highspeed switching operations.

The external storage subsystem 40 comprises a communication port 41 capable of communicating with the storage subsystem 20, and an external LDEV 42.

The preceding is an example of the constitution of a storage system 1 related to this embodiment. Furthermore, the above explanation is one example; other constitutions can be employed. For example, shared memory 25 and cache memory 24 do not have to be separate memories, but rather can be provided as a single memory having a shared memory area and a cache memory area. Also, for example, the controller for the storage subsystem 20 and/or the external storage subsystem 40 can be a circuit board comprising a CPU, a memory, and a communication port. In this case, the CPU can execute the processing performed by a plurality of CHA and DKA.

Figure 2:
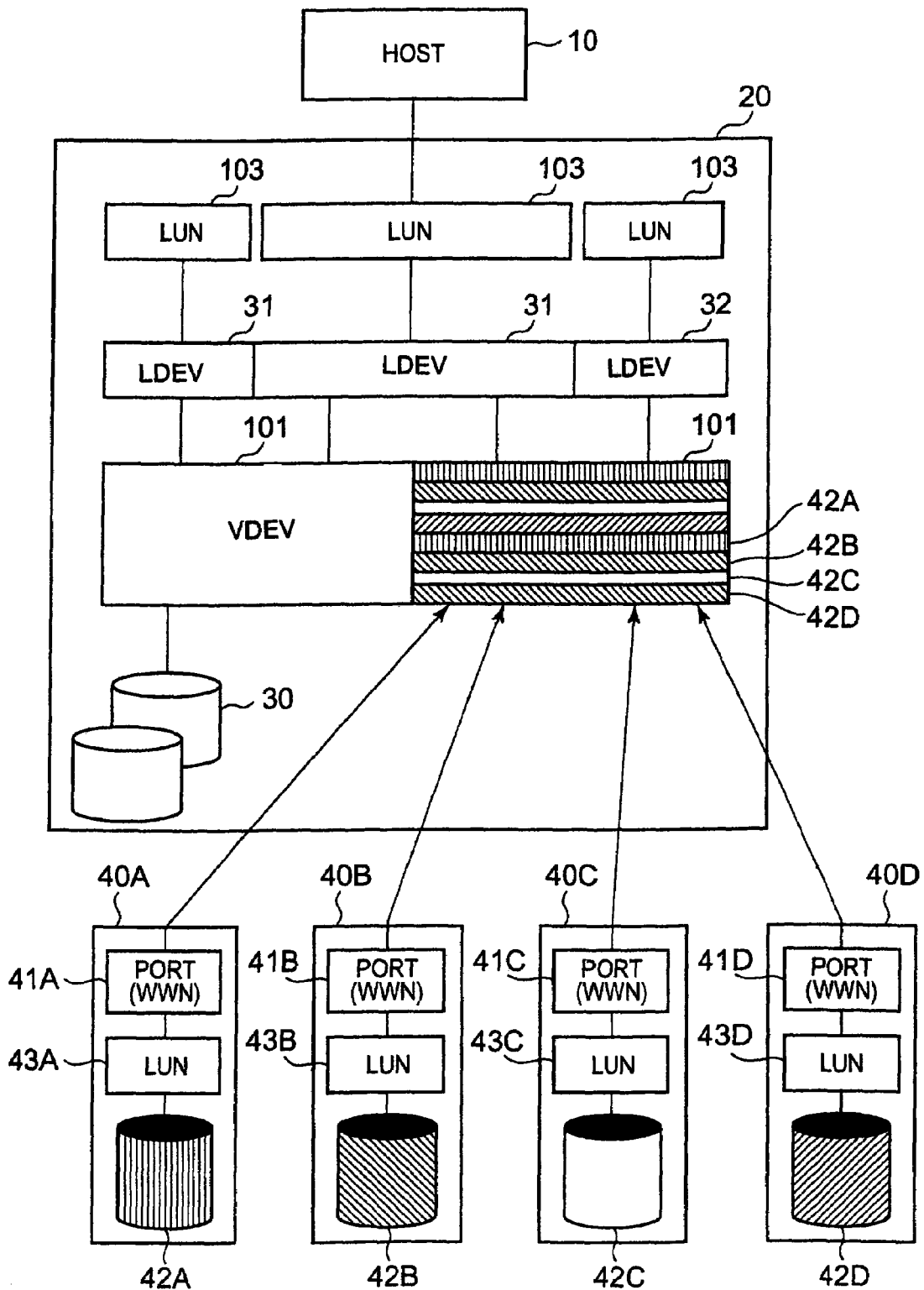
FIG. 2 is a schematic view showing a simplified logical structure of a storage subsystem 20 and an external storage subsystem 40.

FIG. 2 is a schematic view showing a simplified logical structure of the storage subsystem 20 and the external storage subsystem 40.

The storage subsystem 20 has a three-level storage hierarchy comprising, in order from the bottom level, VDEV 101, LDEV 31, 32 and LUN (Logical Unit Number) 103.

A VDEV 101 is a virtual device (Virtual Device) positioned at the bottom of the logical storage hierarchy. The VDEV 101 is a virtualized physical storage resource, and can be applied to a RAID configuration. That is, a plurality of VDEV 101 can be formed from a single disk-type storage device 30 (slicing), or one VDEV 101 can be formed from a plurality of disk-type storage devices 30 (striping). The VDEV 101 shown on the left side of FIG. 2, for example, is a virtualized disk-type storage device 30 according to a prescribed RAID configuration.

Meanwhile, the VDEV 101 shown on the right side of FIG. 2 is constituted by mapping the external LDEV 42 of the external storage subsystem 40. More specifically, in this embodiment, the external LDEV 42 of the external storage subsystem 40 can be used as the internal LDEV 32 of the storage subsystem 20 by mapping them to a VDEV 101. In the example shown in the figure, the VDEV 101 is constructed by striping the four external LDEV 42A through 42D. The respective external LDEV 42A through 42D can be accessed individually by specifying the respective LUN 43A through 43D from the respective communication ports 41A through 41D. WWN, which is unique identification information, is allocated to each communication port 41A through 41D, and an external LDEV can be specified by combining a WWN and a LUN (Logical Unit Number). An LDEV is also called a LU (Logical Unit), and there can be one LU for one LDEV, or there can be one LU for a plurality of LDEV.

An internal LDEV 32 is provided on top of the VDEV 101. The internal LDEV 32 is the LDEV, which virtualizes the VDEV 101. It is possible to connect to two LDEV 32 from a single VDEV 101, and it is possible to connect to one LDEV 32 from a plurality of VDEV 101. The LDEV 32 can be accessed via the respective LUN 103.

The preceding is one example of a simplified logical structure between the storage subsystem 20 and the external storage subsystem 40. In accordance with this structure, a host can access an external LDEV 42 by way of a virtual internal LDEV 32. As an example of this technology, for example, the technology disclosed in Japanese Laid-open Patent No. 2005-107645 can be cited. Also, as another technology, for example, a virtual LDEV of the storage subsystem (for example, an LDEV for which a LUN has been set, but which has no storage resource) can be associated with an external LDEV without going through the VDEV 101, and when there is an I/O command for this virtual LDEV, the external LDEV corresponding to this virtual LDEV can be accessed.

The storage subsystem 20 can carry out the following processing when it receives an I/O command from the host 10.

Figure 3A:
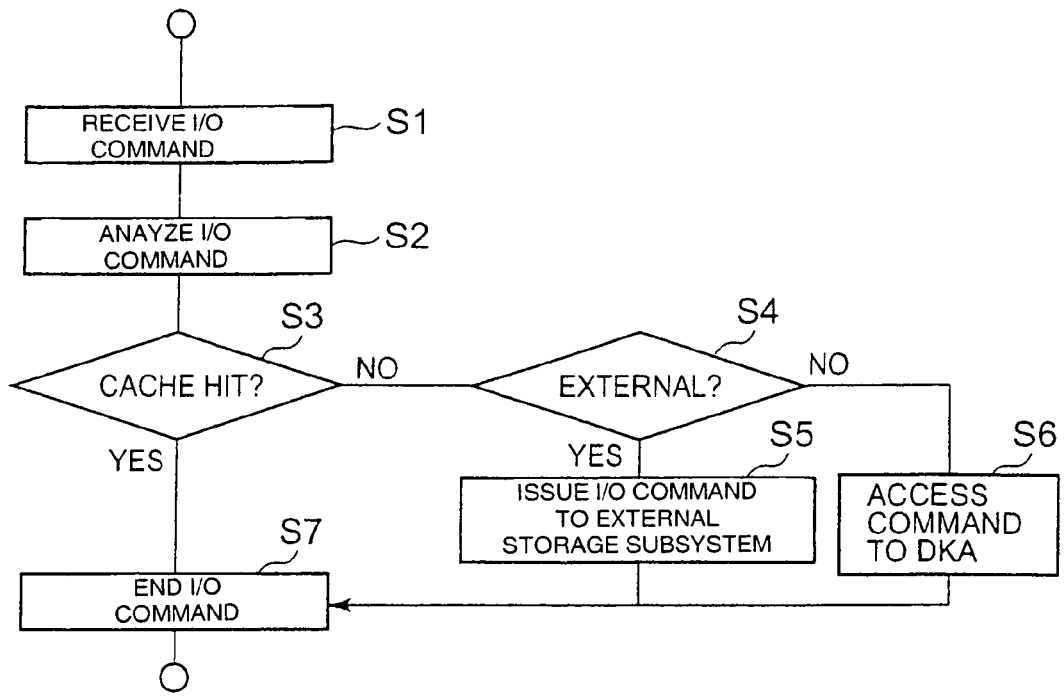
FIG. 3A shows an example of the flow of processing carried out by a storage subsystem 20 upon receiving an I/O command from a host.

FIG. 3A shows an example of the flow of processing carried out by the storage subsystem 20 upon receiving an I/O command from a host. Furthermore, for the sake of convenience, in the following explanation, a CHA 21 capable of communicating with the host 10 will be called a "host CHA 21", and a CHA 21 capable of communicating with the external storage subsystem 40 will be called an "external CHA 21".

For example, information expressing the structure illustrated in FIG. 2 (hereinafter, a mapping table) is stored in a prescribed storage area inside the storage subsystem 20, for example, in shared memory 25.

A host CHA 21, for example, upon receiving an I/O command from the host 10 (Step S1), analyzes this I/O command (S2), and makes a determination as to whether or not there is a cache hit (S3). In S2, for example, the host CHA 21 identifies the LDEV in which data conforming to this I/O command is stored. In S3, for example, the host CHA 21 determines whether or not data conforming to the received I/O command (in other words, either read or write data) is stored in cache memory 24 (and/or whether or not an area for storing this data can be secured in cache memory 24).

When the host CHA 21 determines that there has been a cache hit (S3: Y), it performs processing, which corresponds to the type of the received I/O command, for the host 10 (S7). More specifically, for example, if the received I/O command is a read command, the host CHA 21 can read data conforming to this command from cache memory 24, and send the read data to the host 10. If the received I/O command is a write command, the host CHA 21 can write the data to be written in the cache hit area, and send a write-command-complete notification to the host 10. When the host CHA 21, for example, writes data for an internal LDEV 32 (that is, data to be sent to an external LDEV 42) to cache memory 24, it can store this data by associating it to an address (for example, to a LUN-LBA set of either an internal LDEV 32 or an external LDEV 42). By so doing, the host CHA 21 can make a determination as to whether or not data conforming to a read command from the host 10 resides in cache memory 24 (in other words, whether or not there is a cache hit).

When the host CHA 21 determines that there is no cache hit (S3: N), it determines whether an access destination conforming to the received I/O command corresponds to an internal or external destination (S4). More specifically, for example, the host CHA 21 references the mapping table, and determines whether the LUN specified by this I/O command corresponds to an internal LDEV 31 or an external LDEV 42.

When it is determined in S4 that the LUN corresponds to an internal LDEV 31 (S4: N), the host CHA 21 requests that the DKA 22 access this internal LDEV 31 (to either read data or write data) (S6). Conversely, when it is determined that the LUN corresponds to an external LDEV 42 (S4: Y), the host CHA 21 requests that the external CHA 21 connected to the external storage subsystem 40, which has this external LDEV 42, access this external LDEV 42, and in accordance with this, an I/O command for accessing this external LDEV 42 is issued by the external CHA 21 to this external storage subsystem 40. Thereafter, S7 described hereinabove is executed. That is, when data is read from the external LDEV 42, this data is sent to the host 10, and when data is sent to the external LDEV 42, a write-command-complete notification is sent to the host 10.

Now then, in this embodiment, a step is taken to shorten the length of I/O processing time (the length of time from Si through S7, hereinafter referred to as I/O processing time) relative to the host 10 of the storage subsystem 20 carrying out such processing. This step will be explained in detail hereinbelow.

Figure 3B:
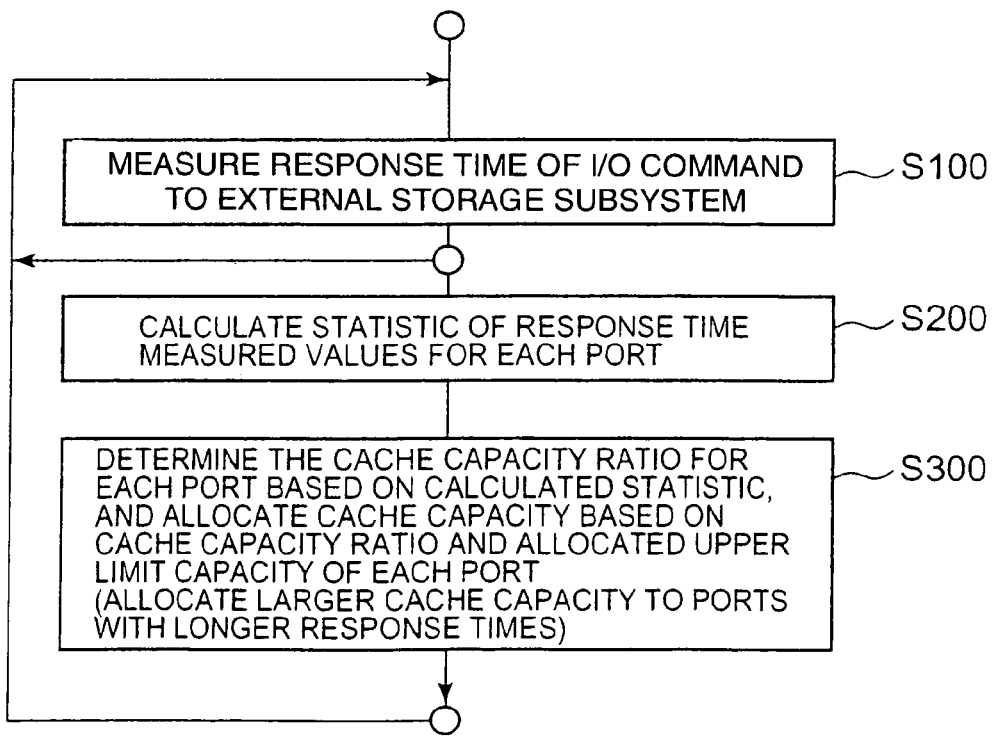
FIG. 3B shows an overview of the flow of processing of a process, which is carried out by the storage subsystem 20, and which constitutes one of the characteristic features of this embodiment.

FIG. 3B shows an overview of the flow of processing of a process, which is carried out by the storage subsystem 20, and which constitutes one of the special characteristics of this embodiment.

An external CHA 21 measures the length of time of the response of an I/O command issued to the external storage subsystem 40 (hereinafter, external response time) for each path element (S100). Here, "response" refers to at least one of the receipt of a command-received response, the receipt of data conforming to a read command, or the receipt of a notification of completion of the writing of data conforming to a write command. In this embodiment, the receipt of a command-received response (for example, ACK) is supposed. Further, a "path element" is an element belonging to the path of an I/O command from an external CHA 21 to an external LDEV 42, and more specifically, for example, is at least one of a communication port 28 of an external CHA 21, a communication port 41 of the external storage subsystem 40, or a LUN of an external LDEV 42. In the following explanation, a path element will be treated as a communication port 41 of the external storage subsystem 40.

The processing of S100, for example, is performed when an external CHA 21 is communicatively connected to the external storage subsystem 40. The processing of S100, for example, is performed either regularly or irregularly. Consequently, when a certain amount of time passes, response time is measured a plurality of times for each communication port 41.

An external CHA 21 calculates for each port a statistic of a plurality of external response time measured values (hereinafter, at times simply called "measured values") whenever a fixed time elapses, or whenever an external response time is measured a prescribed number of times (S200). Then, on the basis of the calculated statistic, the external CHA 21 calculates the ratio of cache capacity for each port, and allocates cache capacity to each port based on the this cache capacity ratio and allocated upper limit capacity of the cache memory 24 (S300). In this S300 processing, larger cache capacity is allocated to a communication port 41 with a longer response time. Furthermore, what is called "cache capacity" here is the capacity of a portion of the area of the cache memory 24. Also, the "allocated upper limit capacity" is the maximum value of cache capacity that can be allocated for accessing the external storage subsystem 40.

Hereinbelow, as a step for realizing this processing, the tables illustrated in FIG. 4A through FIG. 5B can be stored, either together or in a distributed fashion, in a prescribed storage area of the storage subsystem 20, for example, in at least one of the shared memory 25, cache memory 24, or the memory of an external CHA 21.

FIG. 4A shows an example of the constitution of an external storage table.

An external storage table 201 is a table for controlling access to the external storage subsystem 40. In an external storage table 201, for example, a measurement classification, a cache memory 24 allocated upper limit capacity, a verification required/not required, an alarm notification threshold, an I/O response, an I/O count, a cache capacity ratio, and other such items are provided for each communication port 41 (for the respective communication ports A through C in FIG. 4A). The measurement classification, cache memory allocated upper limit capacity, verification required/not required, and alarm notification threshold, for example, are fixed values, which do not dynamically change automatically, and can be set by a manager (the operator of either the SVP 23 or the management terminal 15) The I/O response and I/O count are set automatically by the storage subsystem 20, and cannot be set manually. The cache capacity ratio can be set either manually or automatically (in other words, it can be a fixed value, or a dynamically changing value). Furthermore, these are just examples, and are not necessarily the norm.

External response time can be measured by measuring the length of time it takes from when a dummy I/O command is issued to the external storage subsystem 40 until the response thereto is received. The "issuing of a dummy I/O command" signifies the issuing of an I/O command for measuring external response time, and thus differs from the issuing of an I/O command from a host to an internal LDEV 32 resulting from the receipt of an I/O command. For an I/O command that is issued as a dummy, for example, the access destination range can be set to a narrow range (for example, one block).

As mentioned hereinabove, there are two types of I/O commands, a read command and a write command. The "measurement classification" denotes whether external response time is to be measured by issuing a read command or a write command, and whether or not this measurement method will change dynamically. In this embodiment, there are three types of measurement classifications. These are (R), which denotes that measurement will be performed by issuing a read command, and the measurement method will not change dynamically; (W), which denotes that measurement will be performed by issuing a write command, and the measurement method will not change dynamically; and (Dynamic), which denotes that the measurement method will change dynamically.

"Verification required/not required" denotes whether or not verification will be performed for the data written to an external LDEV 42. In this verification, more specifically, for example, an external CHA 21 saves data written to an external LDEV 42 to cache memory 24, reads the data written to this external LDEV 42 from the external LDEV 42, compares the data saved to cache memory 24 against the read data, and determines whether or not the two sets of data coincide. When the data do not coincide, the external CHA 21 determines that an error has occurred.

"Alarm notification threshold" denotes how many times an error must occur before an alarm notification is issued. For example, if "3" is set as the threshold, when three errors occur in processing (for example, the above-mentioned verification processing) related to a communication port 41 corresponding to this threshold, the storage subsystem 20 (for example, either the external CHA 21 or the host CHA 21) notifies either the SVP 23 or the management terminal 15 (or the host 10) of an alarm.

An "I/O response" is the latest external response time measured value. An "I/O count" is the latest number of external response time measurements. The I/O count, for example, is reset (for example, to zero) each time a statistic of external response time measured values is calculated.

"Cache capacity ratio" denotes a ratio of allocated cache capacity. For example, the cache capacity ratios of communication ports A through C can be allocated as ratios, like 1:2:3 or 2:4:5. Naturally, it is not limited to this, and there are other methods. For example, it can be a ratio determined when the allocated upper limit capacity is treated as 1.

FIG. 4B shows an example of the constitution of a first external response time table. FIG. 4C shows an example of the constitution of a second external response time table.

The first external response time table 203 and the second external response time table 205 are tables for managing external response time measured values. External response time measured values are managed by using either this first external response time table 203 or this second external response time table 205. Both the first external response time table 203 and the second external response time table 205 can be provided for each communication port 41.

The first external response time table 203, for example, records the number of a measurement, and what measured value was obtained. More specifically, for example, if a measurement result of 4 milliseconds was obtained on the second measurement, the measured value "4" is recorded in the column corresponding to the number of measurements "2".

The second external response time table 205, for example, records how many times a measured value, which belongs to a range of measured values of a plurality of ranges of measured values, was obtained. More specifically, for example, if a measurement result of 3 milliseconds is obtained, the number of measurements in the column corresponding to the range "greater than 2 m but less than 4 m" is incremented by 1 (furthermore, the m in FIG. 4B signifies milliseconds).

A CHA 21 (or DKA 22) can display either the first external response time table 203 or the second external response time table 205 on either the SVP 23 or the management terminal 15.

FIG. 5A shows an example of the constitution of an internal storage mapping table.

The internal storage mapping table 202 records where inside the storage subsystem 20 data, which is supposed to be stored in an external LDEV 42, resides. In this embodiment, for example, an internal LDEV 31, which is capable of storing data that is supposed to be stored in an external LDEV 42, is determined beforehand, and the internal storage mapping table 202 records from where inside this internal LDEV 31 data is being stored.

FIG. 5B shows an example of the constitution of a cache memory allocation table.

A cache memory allocation table 204 records the cache capacity ratio to be allocated when a certain type of statistical result is obtained for a plurality of measured values. More specifically, for example, the cache memory allocation table 204 records the cache capacity ratio to be allocated when a statistic belonging to one of a plurality of statistic ranges is obtained. In the example of FIG. 5B, for example, a cache capacity ratio of "3" is allocated for all of the communication ports A through C. According to the example of FIG. 5B, the larger the measured value statistic, the higher the allocated cache capacity ratio. That is, the larger the measured value statistic, the greater the allocated cache capacity will be.

Figure 6A:
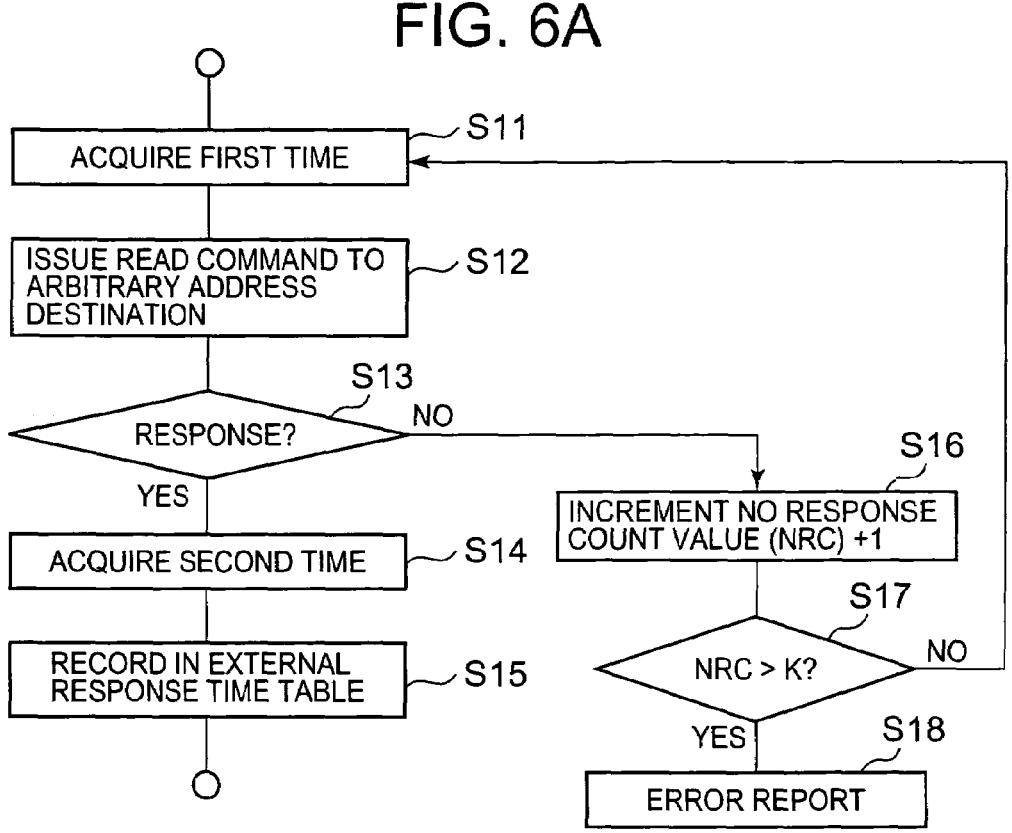
FIG. 6A shows an example of the flow when external response time is measured in accordance with a read command.

FIG. 6A shows one example of the flow when external response time is measured using a read command.

Figure 7A:
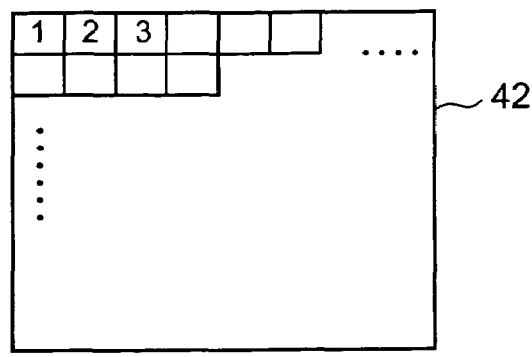
FIG. 7A is an illustration showing that dummy read command access destinations can differ.

When the MP 100C of an external CHA 21 issues a dummy read command for measuring external response time, it acquires the current time at issuance (hereinafter, first time) (S11), and issues a read command for an arbitrary access destination to a certain communication port 41 (S12). Here, an access destination, for example, is a logical block address (LBA) inside any external LDEV 42. An arbitrary access destination signifies an LBA that was not determined in advance. As for an LBA that becomes an access destination (for example, a one-block LBA), as shown in the example shown in FIG. 7A, for example, the access destination LBA will shift each time the number of measurements increases 1, 2, 3 . . . This is done because, if the access destination is the same every time, the access destinations converge, and the external response time becomes longer accordingly.

If there is no response after a fixed time has elapsed following the issuing of the read command (S13: N), the MP 100C increments the no response count value (hereinafter, NRC) by one (S16). When an updated NRC does not exceed a predetermined threshold value K (S17: N), S11 is carried out once again, and if S17 is Y, the MP 100C reports an error to, for example, either the SVP 23 or the management terminal 15 (S18).

If there is a response within a fixed period of time following the issuing of a read command (S13: Y), the MP 100C acquires the current time when this response was received (hereinafter, second time) (S14). Then, the MP 100C updates the external storage table 201, and either external response time table 203 or 205, based on which communication port 41 received the read command, and the measured value, which is the difference between the second time and the first time (S15).

The MP 100C receives, from the external storage subsystem 40, data conforming to the dummy read command issued for measuring external response time, but it can destroy this data without saving it to the cache memory 24.

Figure 6B:
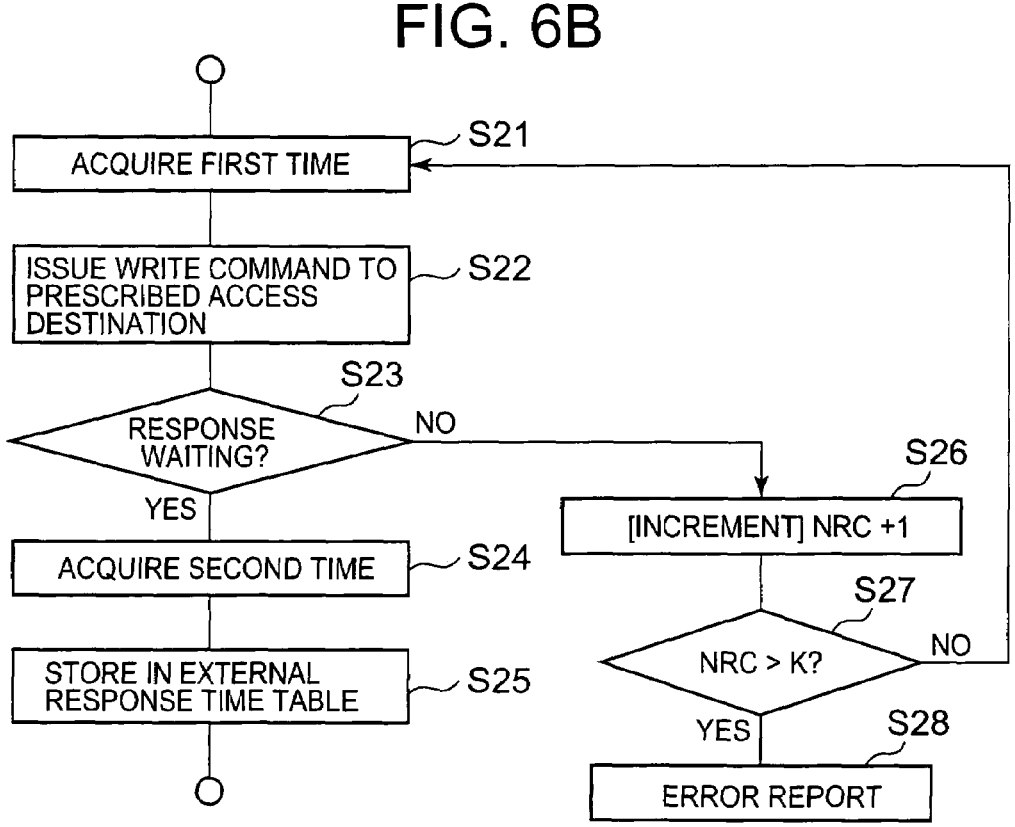
FIG. 6B shows an example of the flow when external response time is measured in accordance with a write command.

FIG. 6B shows an example of the flow when external response time is measured using a write command.

Figure 7B:
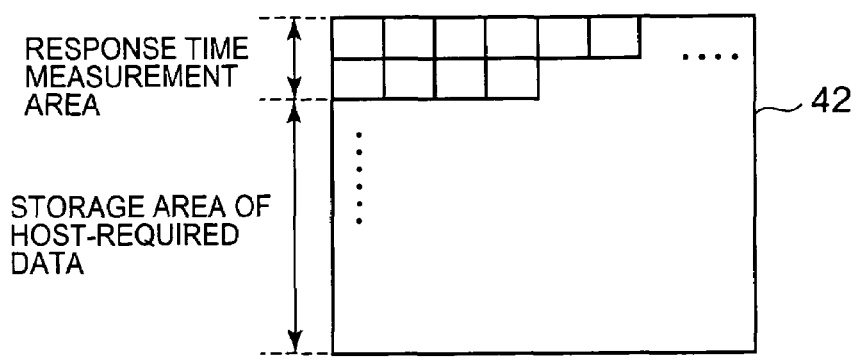
FIG. 7B is an illustration of dummy write command access destinations within a prescribed range of areas of an external LDEV 42.

When the MP 100C of an external CHA 21 issues a dummy write command for measuring external response time, it acquires the current time at issuance (first time) (S21), and issues a write command for a prescribed access destination to a certain communication port 41 (S22). Here, a prescribed access destination signifies a certain LBA, out of a range of LBAs, that was determined in advance, as shown in the example in FIG. 7B. An area for use as the access destination of a dummy write command is provided in at least one external LDEV, and the MP 100C issues a write command, which specifies an LBA belonging to this area (for example, a one-block LBA). This is done to prevent the data read to the host 10 from being overwritten by the dummy write command.

If there is no response after a fixed time has elapsed following the issuing of the write command (S23: N), the MP 100C can carry out the same processing as that of S16 through S18 (S26 through S28).

If there is a response within a fixed period of time following the issuing of the write command (S23: Y), the MP 100C acquires the current time when this response was received (second time) (S24). Then, the MP 100C updates the external storage table 201, and either external response time table 203 or 205, based on which communication port 41 received the write command, and the measured value, which is the difference between the second time and the first time (S25).

Whether external response time is measured using the processing of FIG. 6A or FIG. 6B can be determined by which measurement classification is set in the external storage table 201.

Figure 7C:
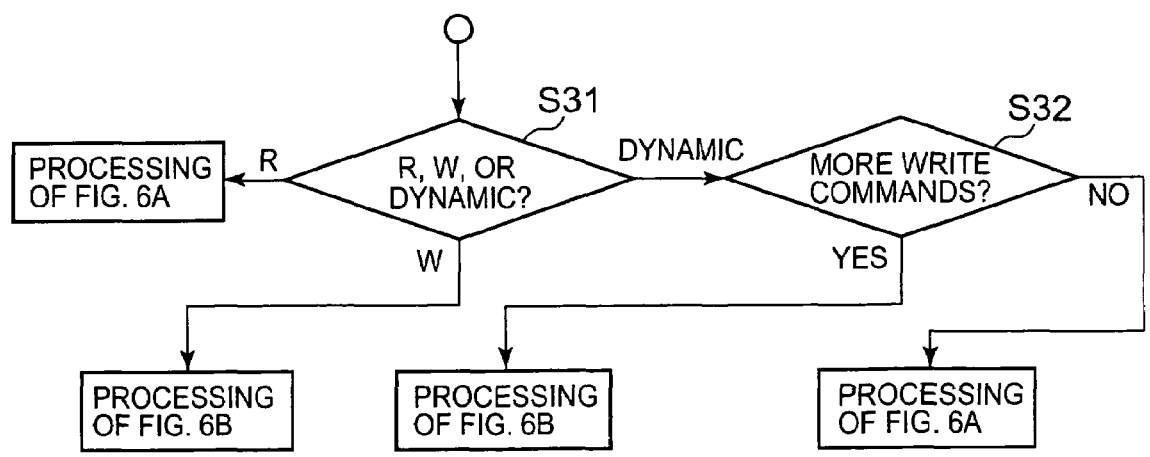
FIG. 7C shows an example of the flow of processing for selecting an external response time measurement method.

FIG. 7C shows an example of the flow of processing for selecting a method for measuring external response time.

When the MP 100C of an external CHA 21 measures the external response time for a certain communication port 41, it references the measurement classification corresponding to this communication port 41 (S31). As a result of this, the MP 100C carries out the processing of FIG. 6A if the measurement classification is R, carries out the processing of FIG. 6B if it is W, and, if the measurement classification is dynamic, the MP 100C makes a determination as to whether or not the I/O commands to an internal LDEV 32 corresponding to an external LDEV 42 are mostly write commands (S32). This can be achieved, for example, by updating the count value corresponding to either a write or a read each time an I/O command is received from the host 10 in accordance with whether this I/O command is a read command or a write command. If the result of S32 is mostly write commands, the processing of FIG. 6B is performed, and if it is mostly read commands, the processing of FIG. 6A is performed.

Figure 8A:
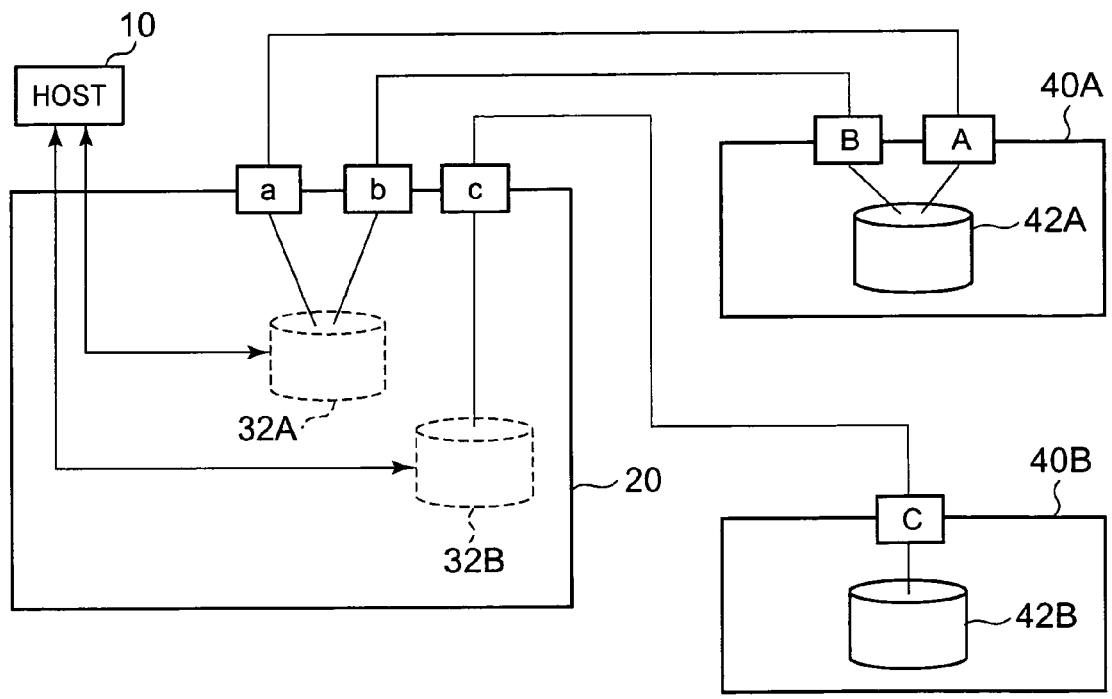
FIG. 8A shows an example of the connections of a storage subsystem 20 and external storage subsystems 40A, 40B.

Furthermore, it is desirable to determine if it is appropriate to measure external response time using the processing of FIG. 6A or the processing of FIG. 6B, for example, in accordance with which systems and data are stored in an external storage subsystem 40 having what communication ports 41. More specifically, for example, as shown in the example of FIG. 8A, if communications ports A, B belong to an external storage subsystem 40A, which performs updating frequently, since write commands are most often issued to this subsystem 40A, it is desirable that the measurement classification for the communication ports A, B (and either internal LDEV 32A or external LDEV 42A) be set to W.

Conversely, if communication port C belongs to an external storage subsystem 40B, which performs read operations frequently, since read commands are most often issued to this subsystem 40B, it is desirable that the measurement classification for the communication port C (and either internal LDEV 32B or external LDEV 42B) be set to R.

Figure 8B:
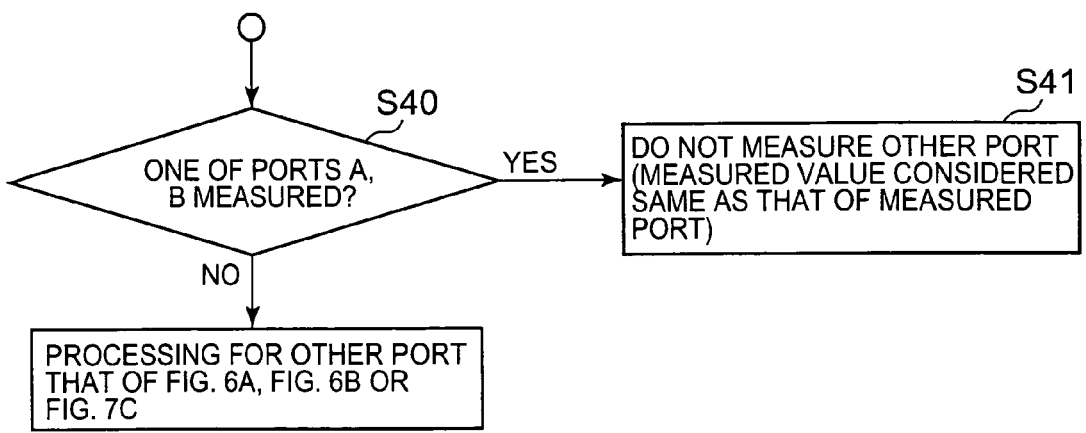
FIG. 8B shows an example of the flow of external response time measurement control for a plurality of communication ports belonging to a certain group.

Further, as shown in the example of FIG. 8B, when an external response time measurement is carried out for at least one communication port 41 (for example, communication port A) of a plurality of communication ports 41, which belong to a certain group (for example, communication ports A and B) (S40: Y), external response time need not be measured for the other communication port 41 belonging to this group (for example, communication port B) (S41). Here, a certain group is a group of communication ports 41 mounted to the same external CHA, or, as shown in the example of FIG. 8A, connected to the same external LDEV 42A. In S41, the external CHA 21 can treat the measured value for this other communication port 41 as being the same as the measured value obtained for the communication port 41 for which a measurement was actually carried out. This makes it possible to allocate the same cache capacity ratio to each communication port belonging to the same group.

Now then, when an external response time measurement is repeated either regularly or irregularly, a plurality of measured values is obtained. The external CHA 21 calculates a statistic of the plurality of measured values for each port (S200 of FIG. 3). For example, when the first external response time table 203 of FIG. 4B is used, the MP 100C of the external CHA 21 can calculate the average of all the measured values from a certain measurement (for example, the measurement subsequent to the final measurement utilized in the last statistic) to a certain measurement (for example, the most recent measurement), and use this average as the statistic. Also, when the second external response time table 205 of FIG. 4C is utilized, the MP 100C can find the range of measured values with the greatest number of times of measurements, and can use this range of measured values as the statistic.

The MP 100C of an external CHA 21 determines the cache capacity ratio corresponding to the calculated statistic for each communication port 41 from the cache memory allocation table 204, and can allocate the determined cache capacity ratio to these communication ports 41 (S300 of FIG. 3B). MP 100C can change the cache capacity allocated to the respective communication ports 41 based on the cache capacity ratio of each communication port 41 and the allocated upper limit capacity.

Figure 9A:
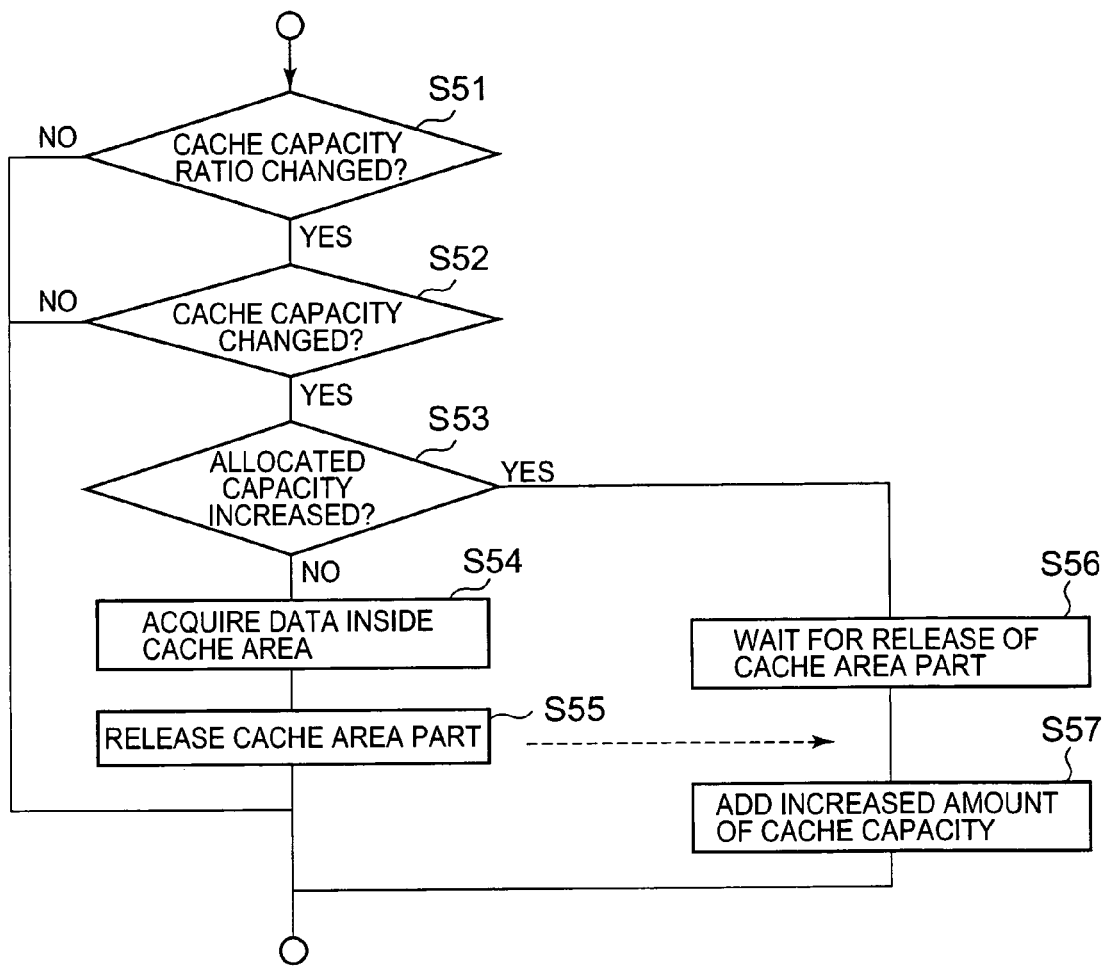
FIG. 9A shows an example of the flow of processing for changing the cache capacity of a certain communication port 41.

FIG. 9A shows an example of the flow of processing for changing the cache capacity of a certain communication port 41.

The MP 100C of an external CHA 21 determines whether or not the cache capacity ratio has changed for at least one communication port 41 (S51), and when there has been a change (S51: Y), it determines whether or not there has been a change in the cache capacity of a certain communication port 41 (S52).

Figure 9B:
FIG. 9B shows an example of the cache capacity ratio of communication ports A through C prior to changing cache capacity.
Figure 9C:
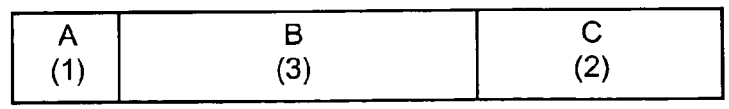
FIG. 9C shows an example of the cache capacity ratio of communication ports A through C subsequent to changing cache capacity.

Here, for example, as shown in the example given in FIG. 9B, the cache capacity ratio of communication ports A through C in S300 for the previous measurement was 1:2:3, and, as shown in the example given in FIG. 9C, the cache capacity ratio of communication ports A through C in S300 for the current measurement is 1:3:2. In this case, for communication port A, the result of S51 is Y, but the result of S52 is not Y. However, for communication ports B and C, both S51 and S52 are Y.

When S52 is Y, for example, and the cache capacity decreases as in communication port C (S53: N), the MP 100C acquires data from the cache area corresponding to communication port C (S54), and clears an area equivalent to the amount of this acquired data (S55). The acquired data is either sent to the external storage subsystem 40B connected to communication port C, sent to the host 10, or deleted.

Conversely, for example, when the cache capacity increases as in communication port B (S53: Y), if the amount of increased capacity is insufficient, the MP 100C waits for a portion of the cache area to be cleared (S56), and adds a portion of the cleared area equivalent to the amount of the increase to the cache area corresponding to communication port B (S57).

An external CHA 21, as described hereinabove, can change the cache capacity ratio and cache capacity allocated to the respective communication ports 41.

As described hereinabove, according to this embodiment, the larger the statistic of external response time measured values, the greater the allocation of cache capacity. Accordingly, when an I/O command is received from the host 10 for an internal LDEV 32, the probability of a cache hit for this I/O command can be heightened in proportion to how large the statistic of external response time measured values is for the communication port 41 to which the I/O command is to be issued. As a result, since it is possible to reduce the need to issue an I/O command to a communication port 41 having the largest statistic of external response time measured values (in other words, a communication port 41 having a poor communication state), the length of time required to process an I/O command from the host 10 can be shortened.

Now then, the host CHA 21 can secure an area for an I/O command from the host 10 in the range of cache capacities allocated as described hereinabove.

Here, for example, the ID (for example, WWN) of a communication port 41, and the LUN of an external LDEV 42 can be associated with each internal LDEV 32 in the mapping table. In this case, when there is no cache hit for an I/O command corresponding to a certain internal LDEV 32, the host CHA 21 can make use of a part of the area of an internal LDEV 31. This will be explained in detail hereinbelow.

Figure 10:
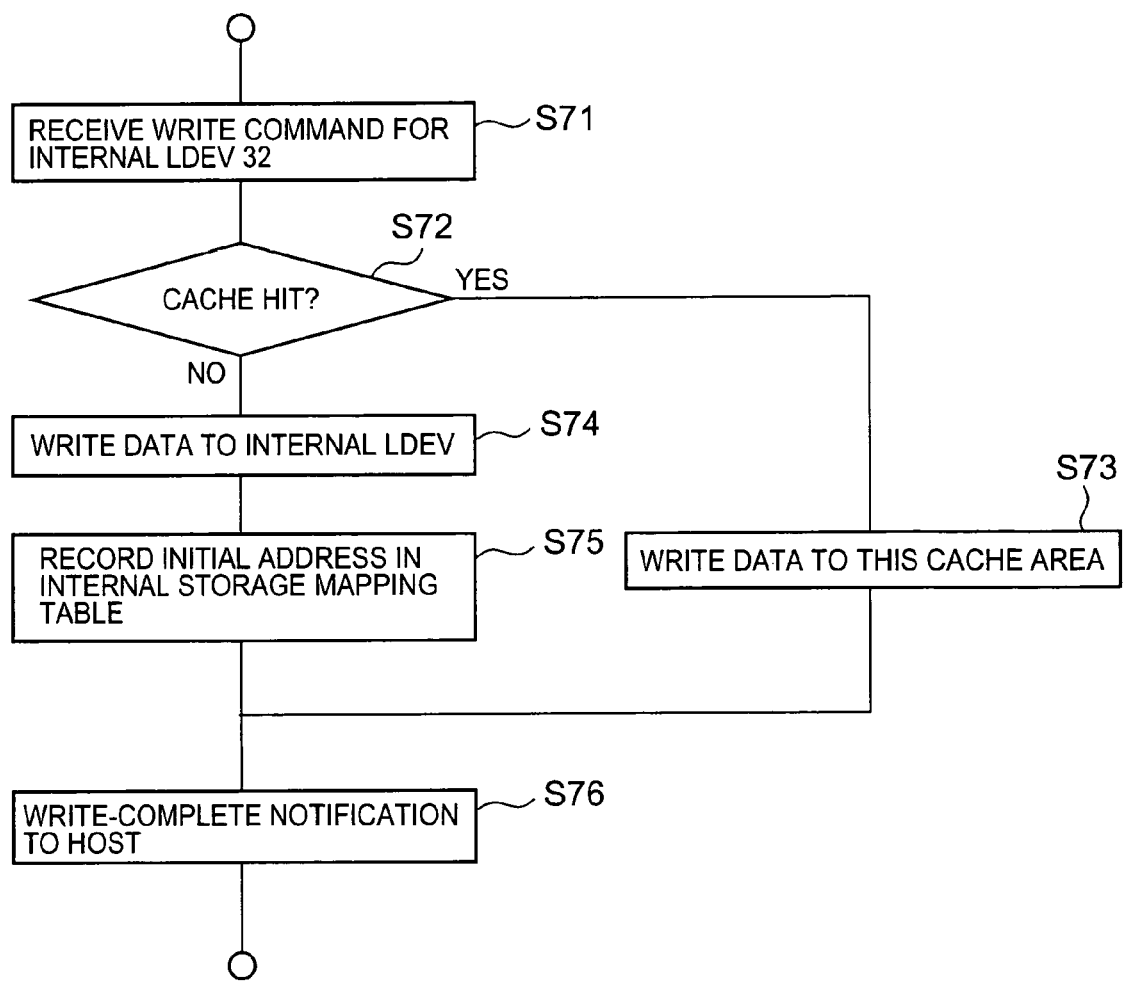
FIG. 10 shows an example of the processing of a host CHA 21, which makes use of an internal LDEV 31 when a write command is received.

FIG. 10 shows an example of the processing of the host CHA 21, which uses an internal LDEV 31 when a write command is received.

The MP 100C of the host CHA 21 receives a write command corresponding to an internal LDEV 32 (S71), and if there is a cache hit in the cache area of the communication port 41 corresponding to this internal LDEV 32 (S72: Y), it writes data to this cache area (S73).

However, if there is no cache hit (S72: N), the MP 100C instructs a DKA 22 to write data to either a prescribed or arbitrary location of either a prescribed or arbitrary internal LDEV 31 (S74). The MP 100C also records the initial address of this data in the internal storage mapping table 202 (S75). Then, the MP 100C sends a write-complete notification to the host 10 (S76).

Figure 11:
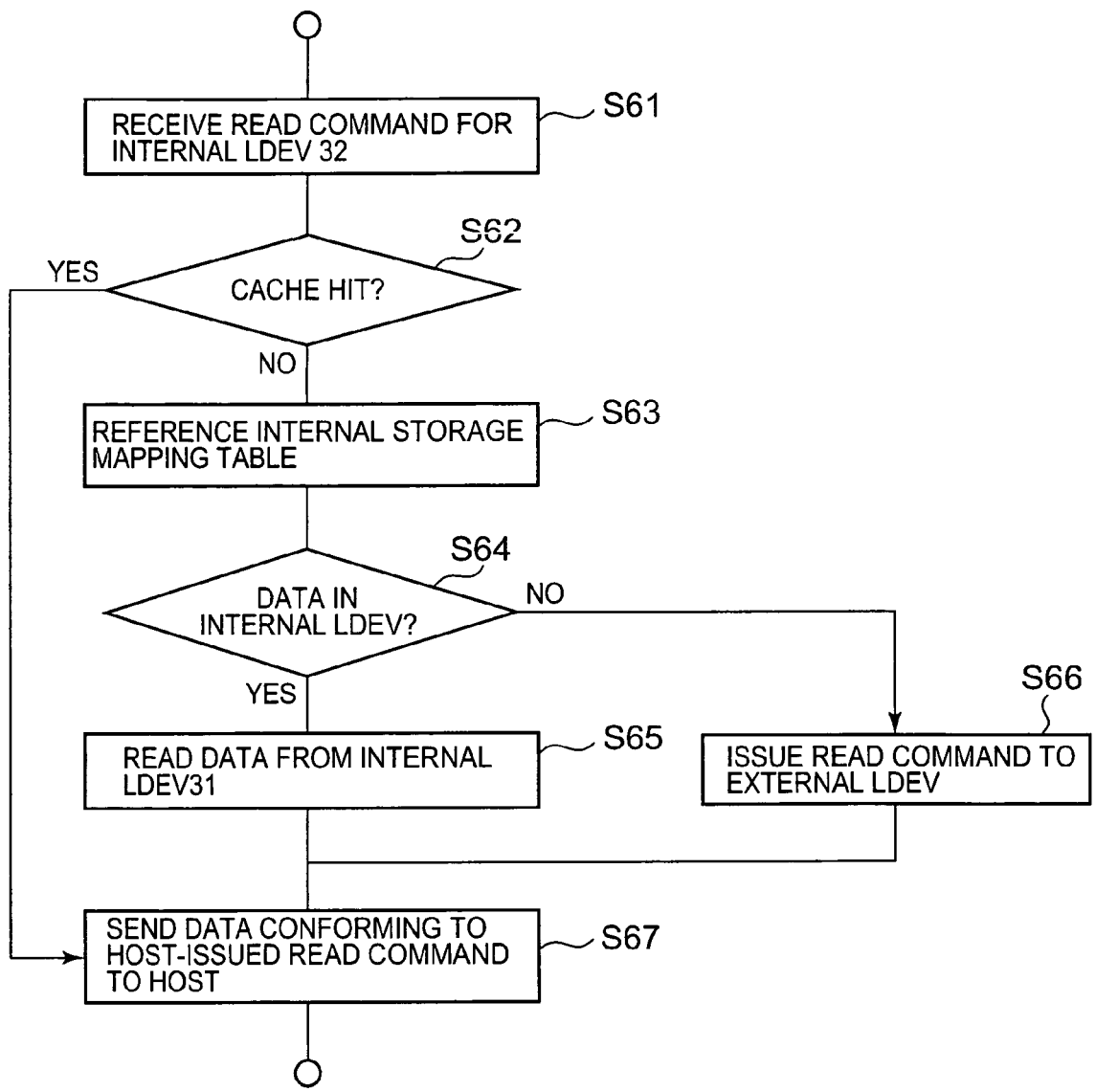
FIG. 11 shows an example of the processing of a host CHA 21, which uses an internal LDEV 31 when a read command is received.

FIG. 11 shows an example of the processing of a host CHA 21, which uses an internal LDEV 31 when a read command is received.

The MP 100c of the host CHA 21 receives a read command corresponding to an internal LDEV 32 (S61), and if there is a cache hit in the cache area of the communication port 41 corresponding to this internal LDEV 32 (S62: Y), it sends the target data in this cache area to the host 10 (S67).

However, if there is no cache hit (S62: N), the MP 100C references the internal storage mapping able 202 (S63). Then, when it is possible to determine that data conforming to the read command received in S61 is in an internal LDEV 31 (S64: Y), the MP 100C instructs a DKA 22 to read the data from this internal LDEV 31 (S65), and send the read data to the host 10 (S67). If it appears that the data is not in an internal LDEV 31 (S64: N), the MP 100C instructs the external CHA 21 to send a read command to read the data from the external LDEV 42 corresponding to an internal LDEV 32 (S66). Thus, a read command for an external LDEV 42 is issued to the external storage subsystem 40.

In this embodiment, a cache capacity is allocated to each communication port of an external CHA 21, and the larger the statistic of measured values, the larger cache capacity is allocated. In other words, the smaller the statistic of measured values, the less cache capacity is allocated. In this case, for example, when numerous I/O commands, which are I/O commands issued to a communication port 41 with a small cache capacity, are received from the host 10, the possibility of a cache hit becomes low, and as a result, there is the likelihood that the length of time required to process an I/O command from the host 10 will become longer. Accordingly, by using a portion of an internal LDEV 31 when there is no cache hit, as in this embodiment, it is possible to hold the lengthening of I/O command processing time in check. In other words, efforts can be made to shorten the length of processing time for an I/O command from the host 10 by enabling as much cache memory 24 support as possible for a larger statistic of measured values.

Now then, in this embodiment, verification processing such as the following can be carried out for a communication port for which "required" is set for verification required/not required in the external storage table 201.

Figure 12:
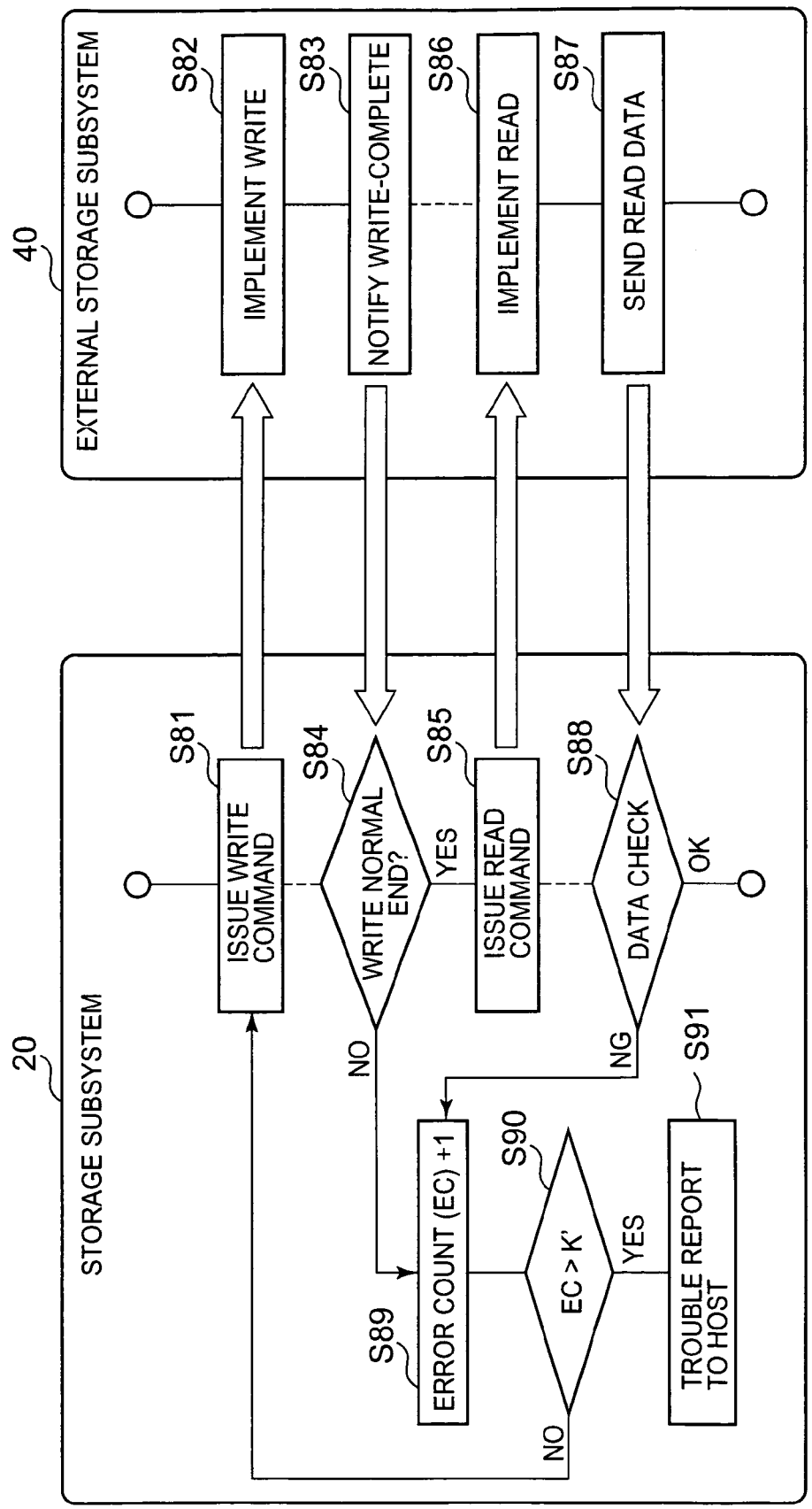
FIG. 12 shows an example of the flow of verification processing.

FIG. 12 shows an example of the flow of verification processing.

An external CHA 21 issues a write command specifying a certain access destination (this can be a dummy write command, or it can be a write command for writing data specified by the host 10) to the communication port 41 for which verification required is set (S81). In the external storage subsystem 40, data is written to the specified access destination (for example, a certain LBA of an external LDEV 42) in accordance with this write command (S82), and a write-complete notification is sent to the storage subsystem 20 in this case (or when there is a cache hit in the external storage subsystem 40) (S83). When the data is written normally, the write-complete notification constitutes data conveying a normal end, and when it is not written, the write-complete notification constitutes data conveying an abnormality.

If the received write-complete notification does not indicate a normal end (S84), the external CHA 21 performs processing of S89 which is described later.

If the received write-complete notification indicates a normal end (S84: Y), the external CHA 21 issues a read command, which specifies the same access destination as the access destination specified by the write command of S81 (it can be a dummy read command, or it can be a read command for reading data specified by the host 10) to the same communication port 41 as in S81 (S85). In the external storage subsystem 40, data is read from the specified access destination in accordance with this read command (S86), and the read data is sent to the storage subsystem 20 (S87).

The external CHA 21 compares the received data against the data targeted for write by the write command sent in S81 (S88). If the result is a match, processing ends, and if it is not a match, the external CHA 21 increments the error count value (hereinafter, EC) by 1, and makes a determination as to whether or not the EC exceeds a prescribed threshold value K (for example, the threshold of the alarm notification set in the external storage table 201) (S90). If it does not exceed the threshold value K (S90: N), the external CHA 21 carries out S81 once again, and if it does exceed the threshold value K (S90: Y), the external CHA 21 issues a trouble report to the host 10 (and/or the SVP 23 and management terminal 15) (S91).

Figure 13A:
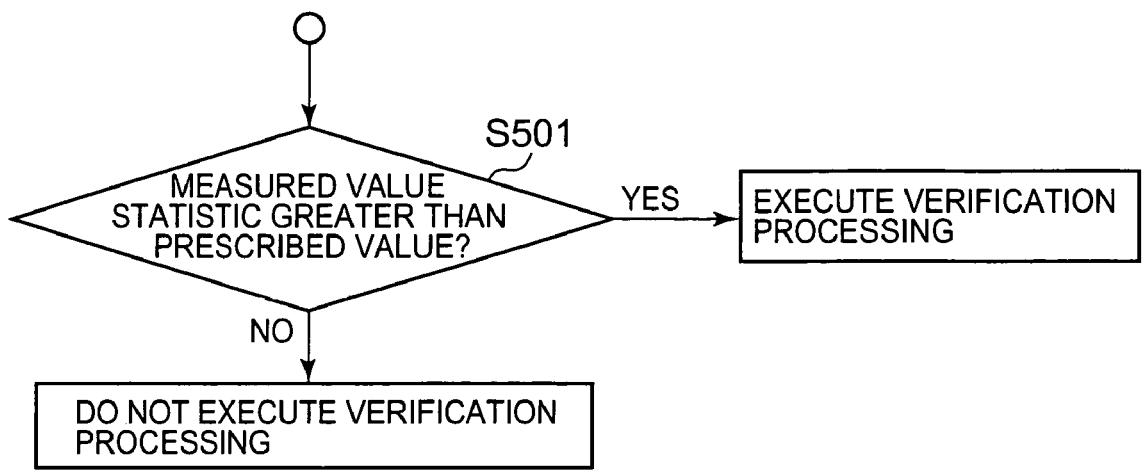
FIG. 13A shows an example of the flow of processing for selecting whether or not verification processing will be carried out.

The external CHA 21 can decide whether or not to execute this kind of verification processing in accordance with the verification required/not required set in the external storage table 201, and it can also dynamically determine whether or not to execute this verification processing based on the statistic of external response time measured values. More specifically, for example, as shown in the example given in FIG. 13A, if the statistic of a plurality of measured values for a certain communication port 41 is greater than a prescribed value (S501: Y), the external CHA 21 can decide to execute verification processing for a write command issued to this communication port 41, and if it is not (S501: N), the external CHA 21 can decide not to execute verification processing for a write command issued to this communication port 41.

Thus, for a communication port 41, which has a statistic of measured values that is smaller than a prescribed value (that is, a communication port 41 that is performing well), verification processing will not be executed since the external storage subsystem 40 is deemed to be stable, and for a communication port 41, which has a statistic of measured values that is not smaller than a prescribed value (that is, a communication port 41 that is performing poorly), verification processing will be executed since there is a high likelihood that some sort of trouble has occurred in the external storage subsystem 40. By so doing, it is possible to enhance the reliability of the data stored in the external storage subsystem 40.

Figure 14:
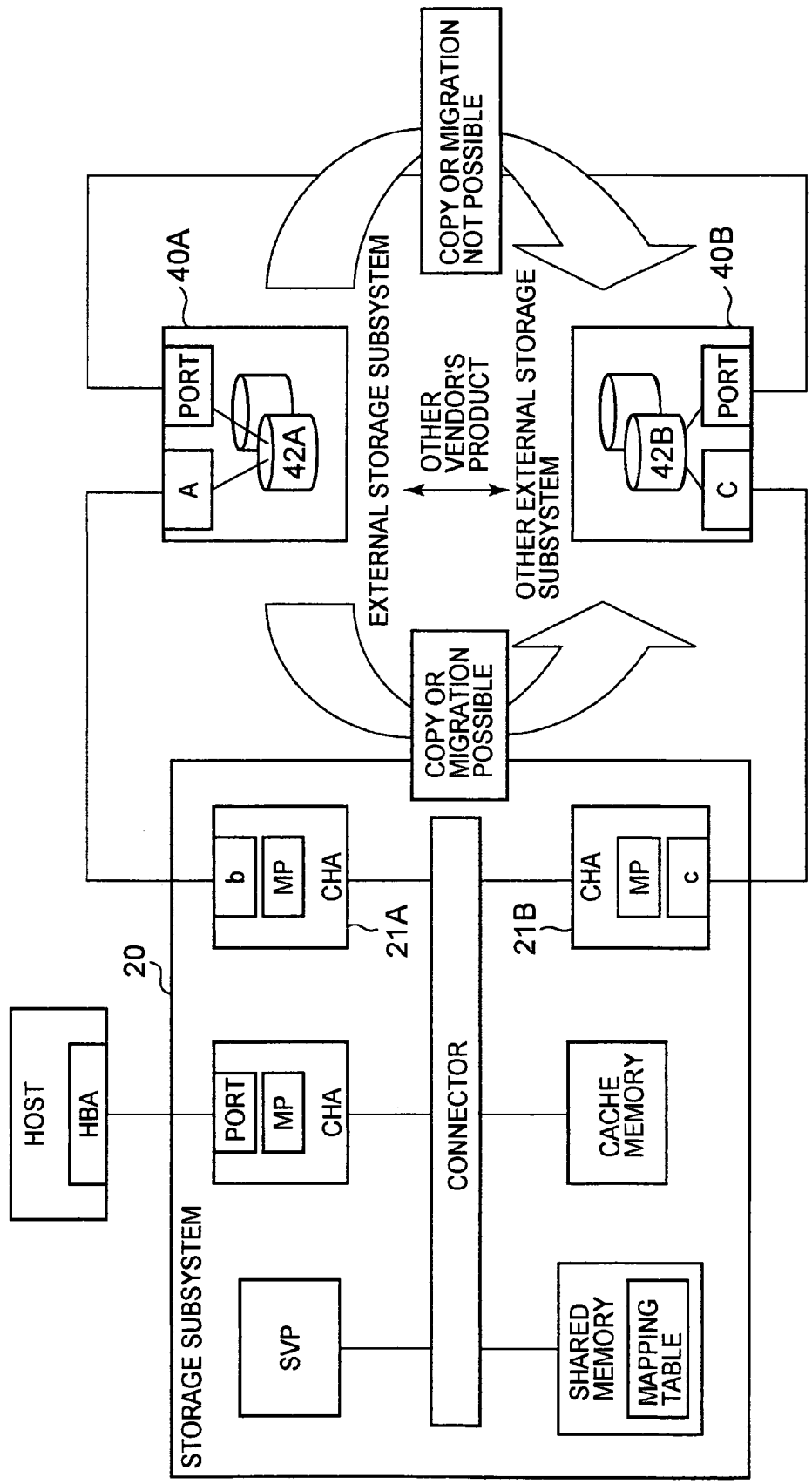
FIG. 14 shows a path that can carry out the copying or migration of data from a first external storage subsystem 40A to a second external storage subsystem 40B, and a path that cannot carry out this processing.

Now then, in this embodiment, a plurality of external storage subsystems 40, for example, a first external storage subsystem 40A, and a second external storage subsystem 40B can be connected to one storage subsystem 20, as shown in the example given in FIG. 14. Also, the second external storage subsystem 40B can be connected to the first external storage subsystem 40A. It is supposed that the attributes (for example, the vendor and maker) of the first external storage subsystem 40A, and the second external storage subsystem 40B differ from one another. In this case, the data inside an external LDEV 42A of the first external storage subsystem 40A cannot be copied or migrated to an external LDEV 42B of the second external storage subsystem 40B without passing through the storage subsystem 20.

However, if this data passes through the storage subsystem 20, either copying or migration such as this becomes possible. More specifically, for example, a first external CHA 21 can read data that is in the external LDEV 42A by way of communication port A, and write the read data to a cache area corresponding to the communication port A, and the second external CHA 21B can read data from the cache area corresponding to the communication port A, and write the read data to the external LDEV 42B via communication port C. In this case, if the data inside the external LDEV 42A is deleted, it becomes a migration, and if it is not, it constitutes a copy.

Figure 13B:
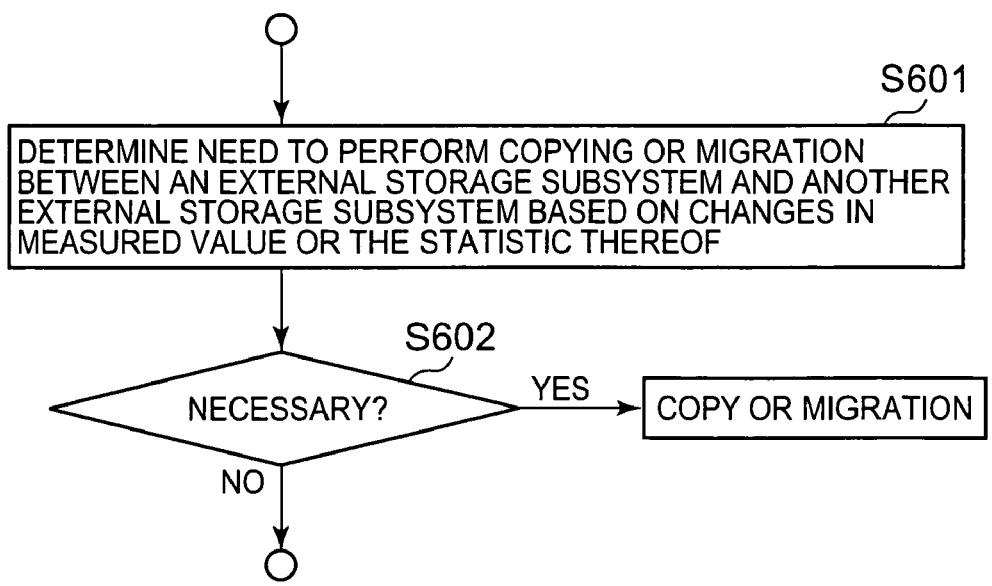
FIG. 13B shows an example of the flow of processing for deciding whether or not to perform data copying or a migration.

Each external CHA 21 can make the following decision as to whether or not to execute this kind of copying or migration. That is, as shown in the example given in FIG. 13B, a certain external CHA 21 will make a determination, based on a change in either a measured value or a statistic thereof, as to whether or not it is necessary to perform copying or a migration between an external storage subsystem 40 and another external storage subsystem 40 (S601), and if it determines this to be necessary (S602: Y), the external CHA 21 carries out copying or a migration.

Here, each external CHA 21 can save a history of either the measured values or statistics of each communication port 41 to a prescribed storage area (for example, shared memory 25). By referencing this history, it is possible to comprehend a change in either a measured value or a statistic. For example, each external CHA 21 can execute copying or a migration if either a measured value or statistic becomes small. This makes it possible to reduce the likelihood of an I/O command being issued to a communication port 41 whose communication state has deteriorated.

The preceding is an explanation of the preferred embodiment of the present invention, but this is merely an example used to explain the present invention, and does not purport to limit the scope of the present invention solely to this embodiment. The present invention can be implemented in a variety of other forms.

What is claimed is:

1. A storage control system of a storage system, which comprises said storage control system, and an external storage subsystem, which is a storage subsystem that exists externally of said storage control system, said storage control system comprising:
   one or more objects to which a plurality of external storage devices is respectively mapped,
   wherein the plurality of external storage devices are a plurality of storage devices provided in said external subsystem;
   a memory that stores data either written to an external storage device or read from an external storage device, and which has two or more memory areas respectively allocated to elements of two or more communication paths connecting said storage control system and said plurality of external storage devices;
   an I/O processor, which receives a first I/O command for a certain object of said one or more objects, and makes an attempt either to acquire data in accordance with the first I/O command, or to secure a storage area for the data in a memory area corresponding to an element of a communication path to the external storage device mapped to said certain object,
   wherein if said attempt succeeds, said I/O processor sends a processing result of said first I/O command, to a transmission source of the first I/O command, and
   wherein if said attempt fails, said I/O processor sends a second I/O command for carrying out access in accordance with said first I/O command to the external storage subsystem having said external storage device mapped to said certain object, and thereafter, sends the processing result to said transmission source;
   a monitor that monitors respective communication states of said two or more communication paths,
   wherein the communication states relates to one or more measured values of said two or more communication paths, respectively; and
   an allocating portion that allocates more memory area capacity to an element of a communication path having a poor communication state according to a result of monitoring the communication states,
   wherein a poor communication state indicates that the one or more measured values of said two or more communication paths, respectively, are greater than a predetermined value.

2. The storage control system according to claim 1,
   wherein said storage control system has one or more first communication ports capable of communicating with one or a plurality of external storage subsystems;
   wherein said external storage subsystem has one or more second communication ports capable of communicating with said storage control system; and
   wherein said communication path element is at least one of a first communication port, a second communication port, or an external storage device, which belongs to the communication path.

3. The storage control system according to claim 1, wherein said communication state is either a measured value of the response time of a second I/O command issued to the communication path, or a statistic of measured values of a plurality of response times.

4. The storage control system according to claim 3, wherein said monitor issues to a certain communication path a dummy second I/O command, which differs from a second I/O command for access in accordance with said first I/O command, and measures the response time by said certain communication path by receiving the response of the dummy second I/O command.

5. The storage control system according to claim 4, wherein said dummy second I/O command is a dummy read command, and said monitor treats the access destination of the dummy read command issued each measurement as being different from the access destination of the previous measurement in the respective communication paths.

6. The storage control system according to claim 4, wherein said dummy second I/O command is a dummy write command, and said monitor takes the access destination of a dummy write command issued each measurement as a prescribed storage area portion in the external storage device in the respective communication paths.

7. The storage control system according to claim 4, wherein said monitor measures response time for a communication path to an external storage subsystem, which receives more read commands than write commands as second I/O commands from the storage control system, by issuing a dummy read command, and measures response time for a communication path to an external storage subsystem, which receives more write commands than read commands as second I/O commands from the storage control system, by issuing a dummy write command 8. The storage control system according to claim 3, wherein said statistic is an average value of said response time measured values of a plurality of measurements.

9. The storage control system according to claim 3, wherein said statistic is a range of response time measured values, of a plurality of ranges of response time measured values, in which the number of obtained response time measured values is the greatest.

10. The storage control system according to claim 1, wherein, when monitoring the communication state of a certain communication path of a plurality of communication paths belonging to a certain group, said monitor treats another communication path of the plurality of communication paths as having the same communication state as said certain communication path, without monitoring the communication state thereof.

11. The storage control system according to claim 1,
    wherein the total capacity of a memory capable of being allocated to the elements of said two or more communication paths is fixed, and said allocating portion determines a ratio of memory area capacity to be allocated to the elements of said respective communication paths based on the communication state of each communication path, determines the memory area capacity to be allocated to the elements of said respective communication paths based on the ratio of memory area capacity of said each communication path element and said total memory capacity, and when there is a change in the memory area capacity of at least a certain communication path, the allocating portion changes the memory area capacity to be allocated to the certain communication path, and the memory area capacity to be allocated to another communication path.

12. The storage control system according to claim 1, wherein said first I/O command is a write command, said storage control system has an internal storage device, which is a different storage device than said memory, and data management information for managing a data storage location, and
wherein if said I/O processor fails in said attempt upon receiving a write command, said I/O processor writes data targeted by said write command to said internal storage device, and registers the data write destination in said data management information.

13. The storage control system according to claim 12, wherein said first I/O command is a read command, and if said I/O processor fails in said attempt upon receiving a read command, said I/O processor determines whether or not the data targeted by said read command is stored in said internal storage device by referencing said data management information, and
wherein if said I/O processor determines the data is stored therein, said I/O processor acquires the target data from said internal storage device, and
wherein if said I/O processor determines the data is not stored therein, said I/O processor sends a read command for reading out the target data to said external storage subsystem.

14. The storage control system according to claim 1, further comprising:
a verifying portion for performing verification processing for a certain communication path if the monitored communication state is poor, and for not performing verification processing if said communication state is good,
wherein said verification process is a process in which data written to said external storage device in accordance with a write command to the external storage device is read, the read data is compared against the data targeted by the write command, and a determination is made as to whether or not the read data and the data targeted by the write command coincide.

15. The storage control system according to claim 1, wherein two or more external storage subsystems are communicatively connected to said storage control system, and
wherein said storage control system further comprises:
a data controller for carrying out data copying or a migration between a certain external storage subsystem and another external storage subsystem when a monitored communication state meets a prescribed condition.

16. The storage control system according to claim 1, wherein said storage control system is communicatively connected to a host that issues a first I/O command to said storage control system, and
wherein said storage control system has an internal storage device, which is a different storage device than said memory,
wherein said I/O processor has a first host interface portion, which is connected to said host, and a second host interface portion, which is communicatively connected to said external storage subsystem,
wherein said first host interface portion requests said second host interface portion to access an external storage device, which is mapped to said certain object, and, in accordance with the request, and wherein said second host interface portion issues said second I/O command to an external storage subsystem connected to itself.

17. A storage control method, which can be realized by a storage system, which comprises a storage control system, and an external storage subsystem, which is a storage subsystem that exists externally of said storage control system, said storage control method comprising the steps of:
receiving a first I/O command for a certain object, of one or more objects to which a plurality of external storage devices is respectively mapped
wherein said external storage devices are a plurality of storage devices provided in said external storage subsystem;
making an attempt either to acquire data in accordance with said received first I/O command, or to secure a storage area for the data in a memory area corresponding to an element of a communication path to the external storage device mapped to said certain object,
wherein said memory area is in a memory that stores data either written to an external storage device or read from an external storage device, and which has two or more memory areas respectively allocated to elements of two or more communication paths connecting said storage control system and said plurality of external storage devices;
if said attempt succeeds, sending a processing result of said first I/O command to a transmission source of the first I/O command;
if said attempt fails, sending a second I/O command for carrying out access in accordance with said first I/O command to the external storage subsystem having said external storage device mapped to said certain object, and thereafter, sending the processing result to said transmission source;
monitoring respective communication states of said two or more communication paths,
wherein the communication states relates to one or more measured values of said two or more communication paths, respectively; and
allocating, as a result of monitoring the communication states, more memory area capacity to the element of the communication path having a poor communication state,
wherein a poor communication state indicates that the one or more measured values of said two or more communication paths, respectively, are greater than a predetermined value.

18. The storage control method according to claim 17, wherein said storage control system has one or more first communication ports capable of communicating with one or a plurality of external storage subsystems,
wherein said external storage subsystem has one or more second communication pods capable of communicating with said storage control system,
wherein said communication path element is at least one of a first communication port, a second communication pod, or an external storage device, which belongs to the communication path, and
wherein said communication state is either a response time measured value of a second I/O command issued to the communication path, or a statistic of a plurality of response time measured values.

19. The storage control method according to claim 17, wherein the total capacity of a memory capable of being allocated to the elements of said two or more communication paths is fixed, wherein the storage control method further comprises:
a step of determining the ratio of memory area capacity to be allocated to the elements of said respective communication paths based on the communication state of each communication path;
a step of determining the memory area capacity to be allocated to the elements of said respective communication paths based on the ratio of memory area capacity of said each communication path element and said total memory capacity; and
a step of changing the memory area capacity to be allocated to the certain communication path, and the memory area capacity to be allocated to another communication path, when there is a change in the memory area capacity of at least a certain communication path.

20. A storage control system of a storage system, said storage system comprising an external storage subsystem, which is a storage subsystem that exists externally of said storage control system, said storage control system, and a host of said storage control system, wherein when said external storage subsystem has one or more first communication ports that communicate with said storage control system, and a plurality of external storage devices, which is a plurality of storage devices, and when said host is constituted so as to issue to said storage control system a first I/O command for either reading data or writing data, said storage control system comprises:
a second communication port that communicates with said host;
one or more third communication ports that communicate with one or a plurality of external storage subsystems;
one or more objects to which said plurality of external storage devices is respectively mapped;
a memory that stores data either written to an external storage device or read from an external storage device, and which has two or more memory areas respectively allocated to elements of two or more communication paths connecting said storage control system and said plurality of external storage devices;
an I/O processor, which receives a first I/O command for a certain object of said one or more objects, and makes an attempt either to acquire data in accordance with the first I/O command, or to secure a storage area for the data in a memory area corresponding to an element of a communication path to the external storage device mapped to said certain object, and
wherein it said attempt succeeds, said I/O processor sends a processing result of said first I/O command, to a transmission source of the first I/O command, and
wherein if said attempt fails, said I/O processor sends a second I/O command, for carrying out access in accordance with said first I/O command, to the external storage subsystem having said external storage device mapped to said certain object, and thereafter, sends the processing result to said transmission source;
a monitor that monitors respective communication states of said two or more communication paths,
wherein the communication states indicate measured values of said two or more communication paths, respectively; and
an allocating portion that allocates more memory area capacity to an element of a communication path having a poor communication state according to a result of monitoring the communication states,
wherein said communication path element is at least one of a first communication port, a third communication port, or an external storage device, which belongs to the communication path,
wherein said communication state is a statistic of measured values of a plurality of response times of second I/O commands issued to the communication path,
wherein said monitor issues to a certain communication path a dummy second I/O command, which is different from a second I/O command for access in accordance with said first I/O command, and measures the response time by said certain communication path by receiving the response of the dummy second I/O command,
wherein said statistic is either the average value of measured values of said plurality of response times, or a range of response time measured values, of a plurality of ranges of response time measured values, in which a number of response time measured values is the greatest,
wherein a total memory capacity capable of being allocated to the elements of said two or more communication paths is fixed, and
wherein said allocating portion determines the memory area capacity to be allocated to the elements of said respective communication paths based on a ratio of memory area capacity of the elements of said respective communication paths and said total memory capacity, allocates a high ratio of the memory area capacity to an element for which said statistic is greater than a prescribed value, and allocates a low ratio of the memory area capacity to an element for which said statistic is less than a prescribed value.

* * * * *